United States Patent
Pan et al.

(10) Patent No.: US 11,516,878 B2
(45) Date of Patent: *Nov. 29, 2022

(54) METHOD AND APPARATUS FOR RELEASING SIDELINK RADIO BEARER IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,934

(22) Filed: Oct. 7, 2020

(65) Prior Publication Data

US 2021/0037593 A1      Feb. 4, 2021

Related U.S. Application Data

(63) Continuation of application No. 16/935,807, filed on Jul. 22, 2020, now Pat. No. 10,873,989.

(60) Provisional application No. 62/931,485, filed on Nov. 6, 2019, provisional application No. 62/882,199, filed on Aug. 2, 2019.

(51) Int. Cl.
*H04W 76/30*      (2018.01)
*H04W 4/40*      (2018.01)
*H04W 76/27*      (2018.01)
*H04W 28/02*      (2009.01)
*H04W 28/10*      (2009.01)
*H04W 80/02*      (2009.01)
*H04W 92/18*      (2009.01)

(52) U.S. Cl.
CPC ............ *H04W 76/30* (2018.02); *H04W 4/40* (2018.02); *H04W 28/0268* (2013.01); *H04W 28/10* (2013.01); *H04W 76/27* (2018.02); *H04W 80/02* (2013.01); *H04W 92/18* (2013.01)

(58) Field of Classification Search
None
See application file for complete search history.

(56) References Cited

U.S. PATENT DOCUMENTS

| 10,873,989 B1 * | 12/2020 | Pan | H04W 28/0268 |
| 10,952,230 B1 * | 3/2021 | Pan | H04W 28/0268 |
| 11,019,670 B1 * | 5/2021 | Pan | H04W 76/14 |

(Continued)

*Primary Examiner* — Anh Vu H Ly
(74) *Attorney, Agent, or Firm* — Blue Capital Law Firm, P.C.

(57) ABSTRACT

A method and apparatus are disclosed from the perspective of a first UE (User Equipment) to indicate a network node for releasing SLRB (Sidelink Radio Bearer) or SL-DRB (Sidelink-Data Radio Bearer). In one embodiment, the method includes transmitting a first RRC (Radio Resource Control) message to a network node for requesting sidelink resource, wherein the first RRC message includes a PFI (PC5 QoS Flow Identifier) of a PC5 QoS (Quality of Service) flow in a first list of PC5 QoS flows. The method also includes receiving a second RRC message from the network node, wherein the second RRC message configures a SLRB and maps the PC5 QoS flow to the SLRB. The method further includes transmitting a third RRC message to the network node if the PC5 QoS flow is deactivated or released, wherein the PFI of the PC5 QoS flow is removed from a second list of PC5 QoS flows included in the third RRC message.

18 Claims, 23 Drawing Sheets

(56) References Cited

U.S. PATENT DOCUMENTS

| | | | |
|---|---|---|---|
| 2020/0296619 A1* | 9/2020 | Pan | H04W 28/0268 |
| 2021/0037593 A1* | 2/2021 | Pan | H04W 76/27 |
| 2021/0211924 A1* | 7/2021 | Pan | H04W 76/27 |
| 2021/0227620 A1* | 7/2021 | Pan | H04W 76/28 |
| 2021/0227621 A1* | 7/2021 | Pan | H04W 24/08 |
| 2021/0259039 A1* | 8/2021 | Pan | H04W 4/40 |

* cited by examiner

Legend:
- PC5-U: The SDAP/PDCP/RLC/MAC/PHY functionality is specified in TS 38.300 [11].
- For PDCP SDU type "Non-IP", a "Non-IP Type" header included in the SDU by upper layer to indicate the type of non-IP messages carried will be specified in stage 3 specification.

Table 1

| Entries | Destinations | PC5 QoS flow IDs | QoS parameters |
|---|---|---|---|
| 1 | L2ID 1 or index 1 | PFI 1 | PQI 1 |
| | | PFI 2 | PQI 2 |
| | | PFI 3 | PQI 3 |
| 2 | L2ID 2 or index 2 | PFI 4 | PQI 4 |
| | | PFI 5 | PQI 5 |

FIG. 15

Table 2a

| Entries | Destinations | PC5 QoS flow IDs | QoS parameters | V2X service types |
|---|---|---|---|---|
| 1 | L2ID 1 or index 1 | PFI 1 | PQI 1 | Type 1 (for V2X Service A) |
| | | PFI 2 | PQI 2 | Type 1 (for V2X Service A) |
| | | PFI 3 | PQI 3 | Type 2 (for V2X Service B) |
| 2 | L2ID 2 or index 2 | PFI 4 | PQI 4 | Type 3 (for V2X Service C) |
| | | PFI 5 | PQI 5 | Type 4 (for V2X Service D) |

Table 2b

| Entries | Destinations | PC5 QoS flow IDs | QoS parameters | PFI sets |
|---|---|---|---|---|
| 1 | L2ID 1 or index 1 | PFI 1 | PQI 1 | Set 1 (for V2X Service A) |
| | | PFI 2 | PQI 2 | Set 1 (for V2X Service A) |
| | | PFI 3 | PQI 3 | Set 2 (for V2X Service B) |
| 2 | L2ID 2 or index 2 | PFI 4 | PQI 4 | Set 3 (for V2X Service C) |
| | | PFI 5 | PQI 5 | Set 4 (for V2X Service D) |

FIG. 16

Table 3a

| Entries | Destinations | PC5 QoS flow IDs | QoS parameters |
|---|---|---|---|
| 1 | L2ID 1 or index 1 | PFI 3 | PQI 3 |
| 2 | L2ID 2 or index 2 | PFI 4 | PQI 4 |
| 2 | L2ID 2 or index 2 | PFI 5 | PQI 5 |

Table 3b

| Entries | Destinations | PC5 QoS flow IDs | QoS parameters | V2X service types |
|---|---|---|---|---|
| 1 | L2ID 1 or index 1 | PFI 3 | PQI 3 | Type 2 (for V2X Service B) |
| 2 | L2ID 2 or index 2 | PFI 4 | PQI 4 | Type 3 (for V2X Service C) |
| 2 | L2ID 2 or index 2 | PFI 5 | PQI 5 | Type 4 (for V2X Service D) |

Table 3c

| Entries | Destinations | PC5 QoS flow IDs | QoS parameters | PFI sets |
|---|---|---|---|---|
| 1 | L2ID 1 or index 1 | PFI 3 | PQI 3 | Set 2 (for V2X Service B) |
| 2 | L2ID 2 or index 2 | PFI 4 | PQI 4 | Set 3 (for V2X Service C) |
| 2 | L2ID 2 or index 2 | PFI 5 | PQI 5 | Set 4 (for V2X Service D) |

FIG. 17

Table 4a

| Entries | Destinations | PC5 QoS flow IDs |
|---|---|---|
| 1 | L2ID 1 or index 1 | PFI 1 |
| | | PFI 2 |

Table 4b

| Entries | Destinations | SLRB IDs |
|---|---|---|
| 1 | L2ID 1 or index 1 | SLRB 1 |
| 2 | L2ID 1 or index 1 | SLRB 2 |

Table 4c

| Entries | Destinations | V2X service types |
|---|---|---|
| 1 | L2ID 1 or index 1 | Type 1 (for V2X Service A) |

Table 4d

| Entries | Destinations | PFI sets |
|---|---|---|
| 1 | L2ID 1 or index 1 | Set 1 (for V2X Service A) |

FIG. 18

Table 5a

| Entries | PC5 QoS flow IDs |
|---|---|
| 1 | PFI 1 |
| 2 | PFI 2 |

Table 5b

| Entries | SLRB IDs |
|---|---|
| 1 | SLRB 1 |
| 2 | SLRB 2 |

Table 5c

| Entries | V2X service types |
|---|---|
| 1 | Type 1 (for V2X Service A) |

Table 5d

| Entries | PFI sets |
|---|---|
| 1 | Set 1 (for V2X Service A) |

METHOD AND APPARATUS FOR RELEASING SIDELINK RADIO BEARER IN A WIRELESS COMMUNICATION SYSTEM

CROSS-REFERENCE TO RELATED APPLICATIONS

The present application is a continuation of U.S. patent application Ser. No. 16/935,807, filed Jul. 22, 2020, which claims the benefits of U.S. Provisional Patent Application Ser. No. 62/882,199 filed on Aug. 2, 2019 and U.S. Provisional Patent Application Ser. No. 62/931,485 filed on Nov. 6, 2019, the entire disclosures of which are incorporated herein in its entirety by reference.

FIELD

This disclosure generally relates to wireless communication networks, and more particularly, to a method and apparatus for releasing sidelink radio bearer in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first UE (User Equipment) to indicate a network node for releasing SLRB (Sidelink Radio Bearer) or SL-DRB (Sidelink-Data Radio Bearer). In one embodiment, the method includes transmitting a first RRC (Radio Resource Control) message to a network node for requesting sidelink resource, wherein the first RRC message includes a PFI (PC5 QoS Flow Identifier) of a PC5 QoS (Quality of Service) flow in a first list of PC5 QoS flows. The method also includes receiving a second RRC message from the network node, wherein the second RRC message configures a SLRB and maps the PC5 QoS flow to the SLRB. The method further includes transmitting a third RRC message to the network node if the PC5 QoS flow is deactivated or released, wherein the PFI (PC5 QoS Flow Identifier) of the PC5 QoS flow is removed from a second list of PC5 QoS flows included in the third RRC message.

BRIEF DESCRIPTION OF THE DRAWINGS

FIG. 15 shows Table 1 according to one exemplary embodiment.

FIG. 16 shows Tables 2a and 2b according to exemplary embodiments.

FIG. 17 shows Tables 3a, 3b, and 3c according to exemplary embodiments.

FIG. 18 shows Tables 4a, 4b, 4c, and 4d according to exemplary embodiments.

FIG. 19 shows Tables 5a, 5b, 5c, and 5d according to exemplary embodiments.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TR 23.786 V1.0.0, "Architecture enhancements for 5G System (5GS) to support Vehicle-to-Everything (V2X) services (Release 16)"; TS 36.331 V15.3.0, "E-UTRA; Radio Resource Control (RRC) Protocol specification (Release 15)"; TS 23.287 V110, "Architecture enhancements for 5G System (5GS) to support Vehicle-to-Everything (V2X) services"; 3GPP RAN2 #106 Chairman's note; TS 38.885 V16.0.0, "NR; Study on NR Vehicle-to-Everything (V2X) (Release 16)"; TS 37.324 V15.1.0, "E-UTRA and NR; Service Data Adaptation Protocol (SDAP) specification (Release 15)"; and 3GPP TS 38.331 V15.6.0, "NR; Radio Resource Control (RRC) protocol specification (Release 15)". The standards and documents listed above are hereby expressly incorporated by reference in their entirety.

Figure 1:
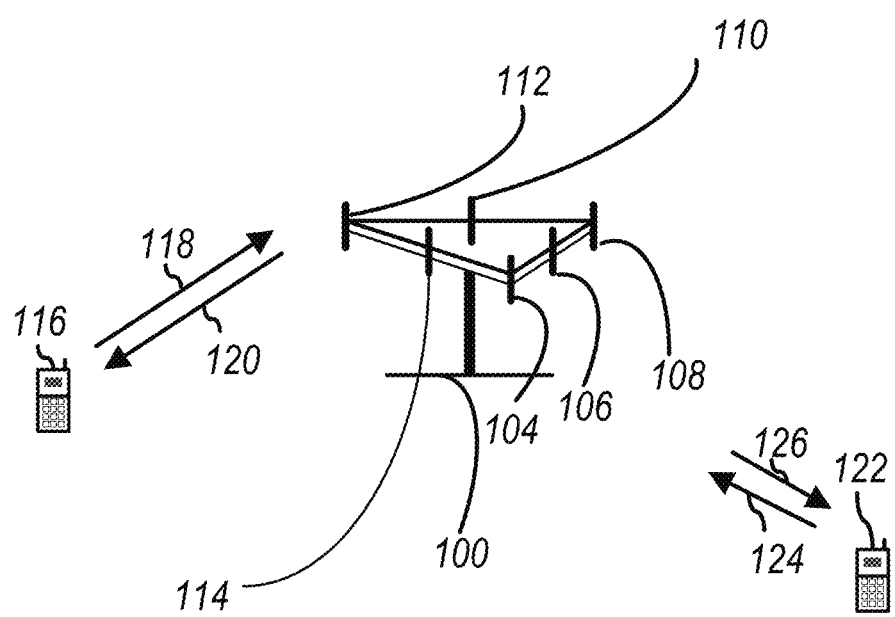
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
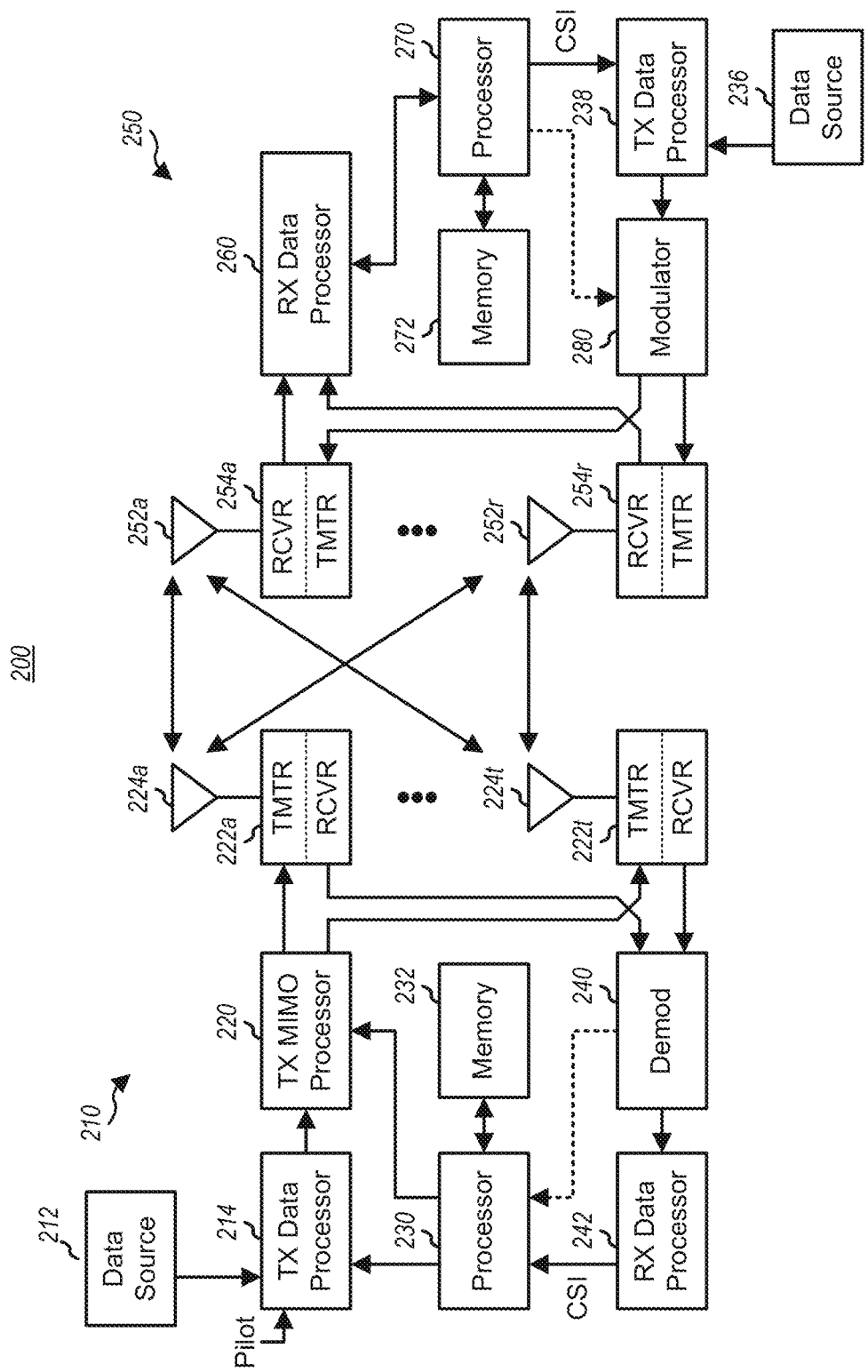
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 then determines which pre-coding matrix to use for determining the beamforming weights then processes the extracted message.

Figure 3:
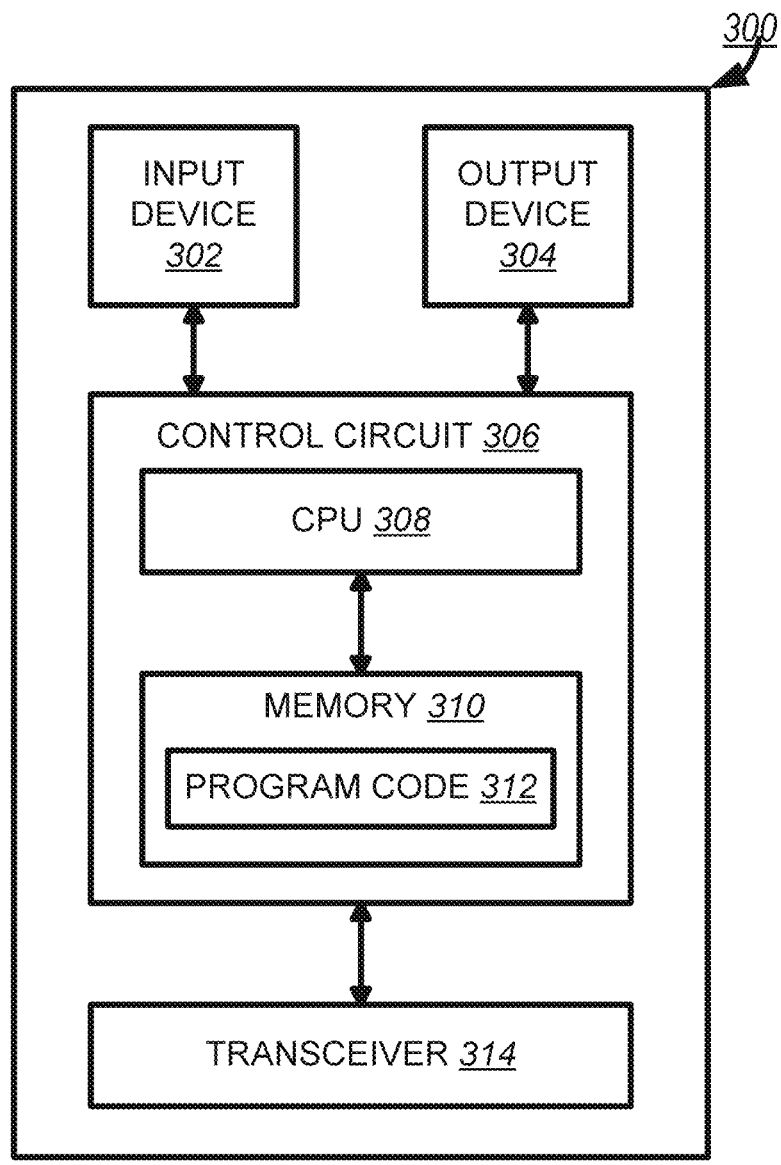
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
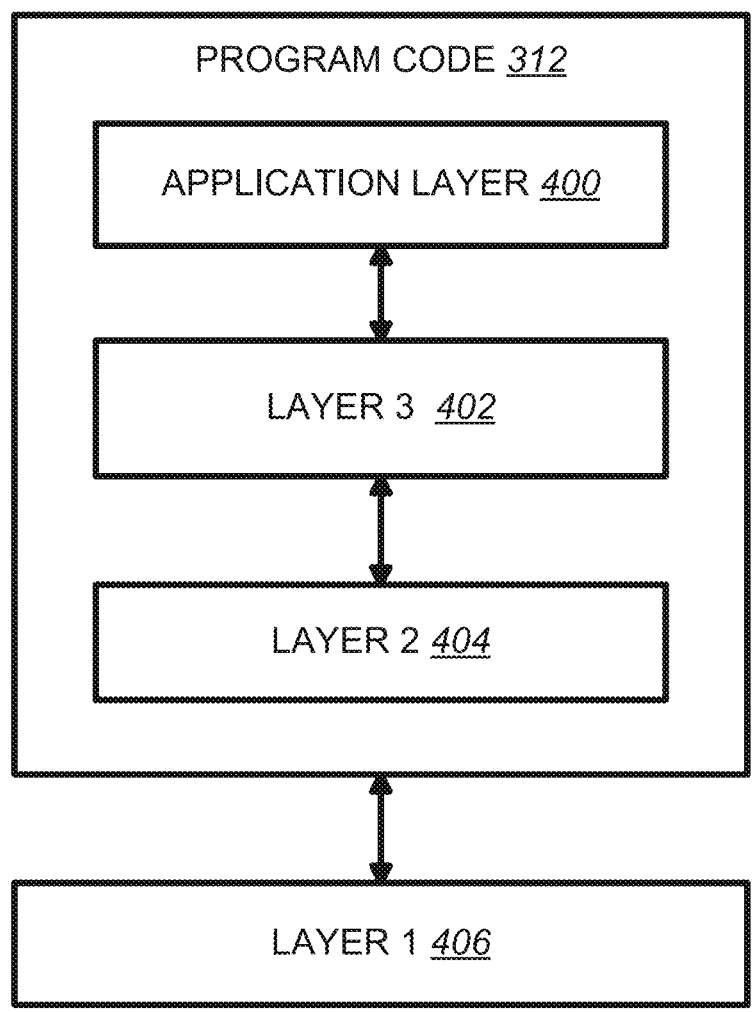
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.885 introduced QoS (Quality of Service) management for NR V2X sidelink as follows:

7 QoS Management

QoS management is relevant to V2X in the context of its use in resource allocation, congestion control, in-device coexistence, power control and SLRB configuration. Physical layer parameters related to QoS management are the priority, latency, reliability and minimum required communication range (as defined by higher layers) of the traffic being delivered. Data rate requirements are also supported in the AS. A SL congestion metric and, at least in resource allocation mode 2, mechanisms for congestion control are needed. It is beneficial to report the SL congestion metric to gNB.

For SL unicast, groupcast and broadcast, QoS parameters of V2X packets are provided by upper layers to the AS. For SL unicast, the SLRBs are (pre-)configured based on the signalling flows and procedures shown in FIGS. 7-1 and 7-2. The per-flow QoS model described in [6] is assumed in upper layers.

Figure 5:
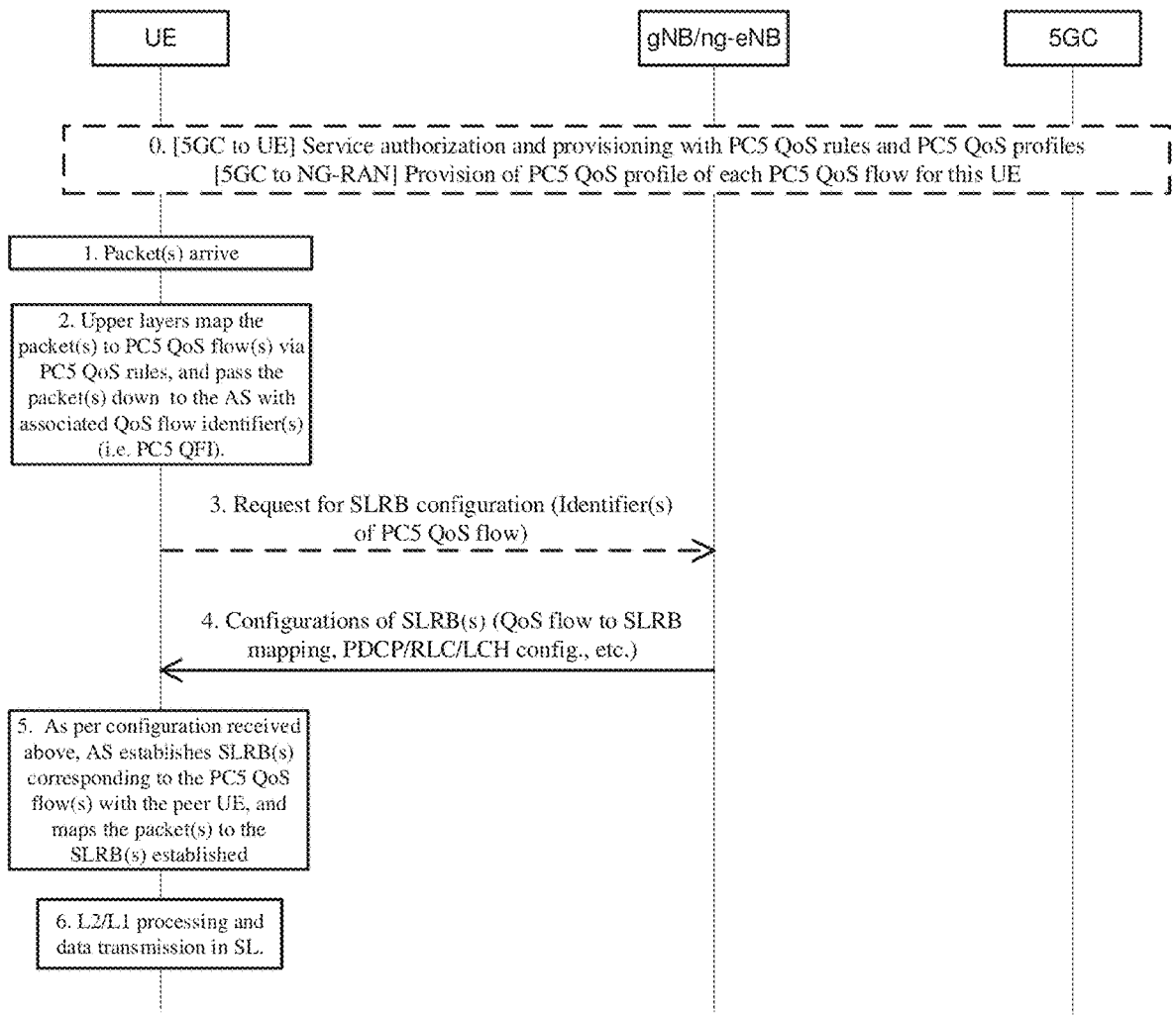
FIG. 5 is a reproduction of FIG. 7-1 of 3GPP TS 38.885 V16.0.0.
Figure 7:
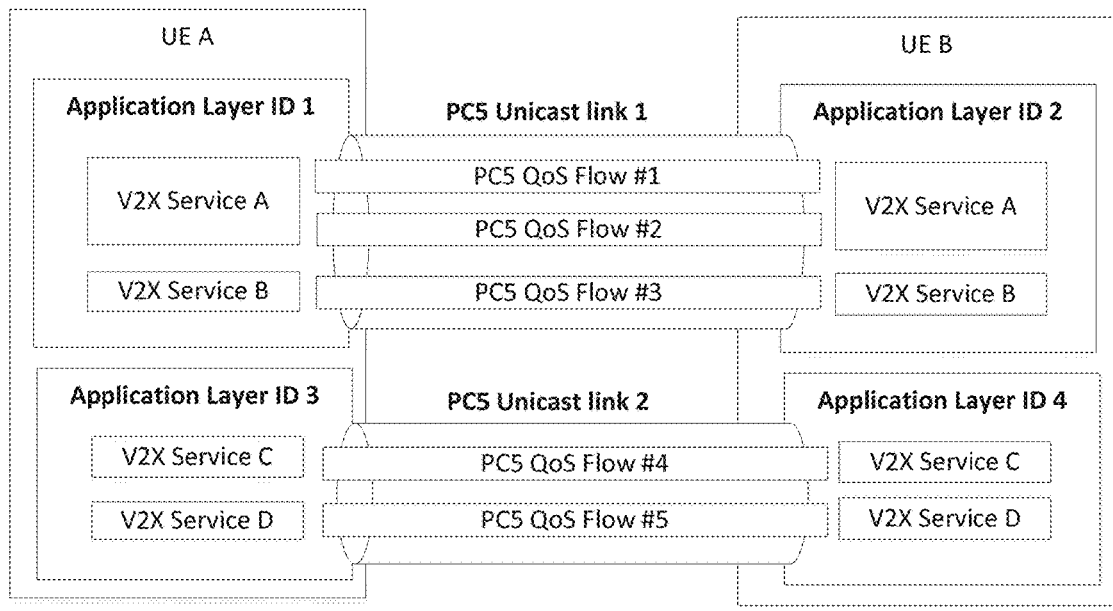
FIG. 7 is a reproduction of FIG. 5.2.1.4-1 of 3GPP TR 23.786 V1.0.0.

[FIG. 7-1 of 3GPP TS 38.885 V16.0.0, entitled "SLRB configuration for SL unicast (UE-specific)", is reproduced as FIG. 5]

In Step 0 of FIG. 7-1, the PC5 QoS profile, i.e. a set of specific PC5 QoS parameters, and PC5 QoS rule for each PC5 QoS flow are provisioned to the UE in advance by service authorization and provisioning procedures as in [6]; similarly, PC5 QoS profile for each QoS flow is also provisioned to the gNB/ng-eNB in advance. Then, when packet(s) arrive, the UE can first derive the identifier of the associated PC5 QoS flow(s) (i.e. PC5 QFI) based on the PC5 QoS rules configured in Step 0, and may then report the derived PC5 QFI(s) to the gNB/ng-eNB in Step 3. The gNB/ng-eNB can derive the QoS profile(s) of these reported PC5 QFI(s) based on the provisioning from 5GC in Step 0, and may signal the configurations of the SLRB(s) associated with the PC5 QFI(s) UE reported via RRC dedicated signalling in Step 4. These SLRB configurations may include PC5 QoS flow to SLRB mapping, SDAP/PDCP/RLC/LCH configurations, etc. In Step 5, the UE in the AS establishes SLRB(s) associated with the PC5 QFI(s) of the packet(s) with the peer UE as per gNB/ng-eNB configuration, and maps available packet(s) to the SLRB(s) established. SL unicast transmission can then occur.

NOTE: How the PC5 QFI is defined is up to SA2 WG2.

3GPP TS 36.331 stated:

5.10.2 Sidelink UE Information 5.10.2.1 General

Figure 6:
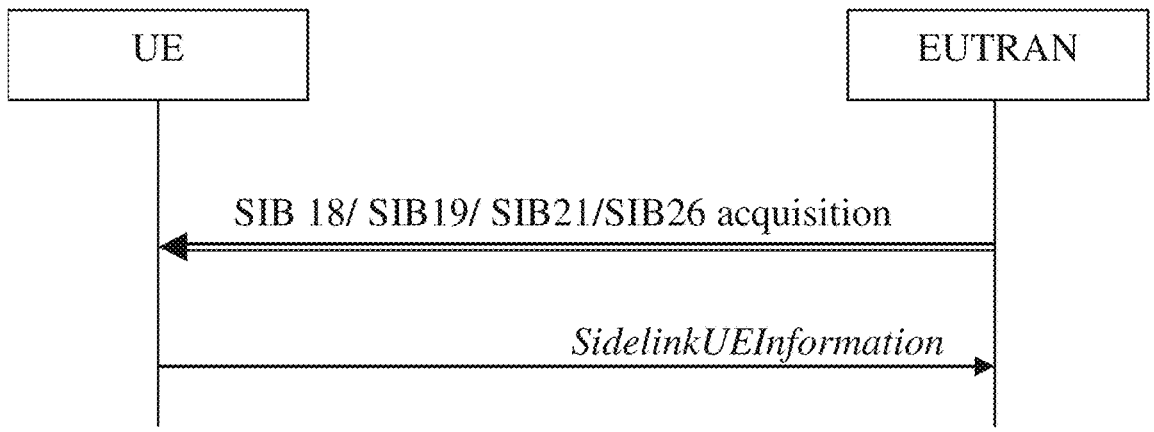
FIG. 6 is a reproduction of FIG. 5.10.2-1 of 3GPP TS 36.331 V15.3.0.

[FIG. 5.10.2-1 of 3GPP TS 36.331 V15.3.0, entitled "Sidelink UE information", is reproduced as FIG. 6]

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.2 Initiation

A UE apable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

NOTE 1: A UE in RRC_IDLE that is configured to transmit sidelink communication/V2X sidelink communication/sidelink discovery announcements, while SystemInformationBlockType18/SystemInformationBlockType19/SystemInformationBlockType21 including sl-V2X-ConfigCommon or SystemInformationBlockType26 does not include the resources for transmission (in normal conditions), initiates connection establishment in accordance with 5.3.3.1a.

Upon initiating the procedure, the UE shall:
[ . . . ]
1> if SystemInformationBlockType21 including sl-V2X-ConfigCommon is broadcast by the PCell:
  2> ensure having a valid version of SystemInformationBlockType21 and SystemInformationBlockType26, if broadcast, for the PCell;
  2> if configured by upper layers to receive V2X sidelink communication on a primary frequency or on one or more frequencies included in v2x-InterFreqInfoList, if included in SystemInformationBlockType21 or SystemInformationBlockType26 of the PCell:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType21 including sl-V2X-ConfigCommon; or
    3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:
      4> initiate transmission of the SidelinkUEInformation message to indicate the V2X sidelink communication reception frequency(ies) of interest in accordance with 5.10.2.3;
  2> else:
    3> if the last transmission of the SidelinkUEInformation message included v2x-CommRxInterestedFreqList:
      4> initiate transmission of the SidelinkUEInformation message to indicate it is no longer interested in V2X sidelink communication reception in accordance with 5.10.2.3;
  2> if configured by upper layers to transmit V2X sidelink communication on a primary frequency or on one or more frequencies included in v2x-InterFreqInfoList, if included in SystemInformationBlockType21 or SystemInformationBlockType26 of the PCell:
    3> if the UE did not transmit a SidelinkUEInformation message since last entering RRC_CONNECTED state; or
    3> if since the last time the UE transmitted a SidelinkUEInformation message the UE connected to a PCell not broadcasting SystemInformationBlockType21 including sl-V2X-ConfigCommon; or
    3> if the last transmission of the SidelinkUEInformation message did not include v2x-CommTxResourceReq; or if the information carried by the v2x-CommTxResourceReq has changed since the last transmission of the SidelinkUEInformation message:
      4> initiate transmission of the SidelinkUEInformation message to indicate the V2X sidelink communication transmission resources required by the UE in accordance with 5.10.2.3;
  2> else:
    3> if the last transmission of the SidelinkUEInformation message included v2x-CommTxResourceReq:
      4> initiate transmission of the SidelinkUEInformation message to indicate it no longer requires V2X sidelink communication transmission resources in accordance with 5.10.2.3;
      SidelinkUEInformation The SidelinkUEInformation message is used for the indication of sidelink information to the eNB.
Signalling radio bearer: SRB1
RLC-SAP: AM
Logical channel: DCCH
Direction: UE to E-UTRAN SidelinkUEInformation Message

```
-- ASN1START
...
SidelinkUEInformation-v1430-IEs ::= SEQUENCE {
    v2x-CommRxInterestedFreqList-r14    SL-V2X-CommFreqList-r14         OPTIONAL,
    p2x-CommTxType-r14                  ENUMERATED {true}               OPTIONAL,
    v2x-CommTxResourceReq-r14           SL-V2X-CommTxFreqList-r14       OPTIONAL,
    nonCriticalExtension                SidelinkUEInformation-v1530-IEs OPTIONAL
}
SidelinkUEInformation-v1530-IEs ::= SEQUENCE {
    reliabilityInfoListSL-r15           SL-ReliabilityList-r15          OPTIONAL,
    nonCriticalExtension                SEQUENCE { }                    OPTIONAL
}
...
SL-V2X-CommFreqList-r14 ::= SEQUENCE (SIZE (1..maxFreqV2X-r14)) OF INTEGER (0..maxFreqV2X-1-r14)
SL-V2X-CommTxFreqList-r14 ::= SEQUENCE (SIZE (1..maxFreqV2X-r14)) OF SL-V2X-CommTxResourceReq-r14
SL-V2X-CommTxResourceReq-r14 ::=        SEQUENCE {
    carrierFreqCommTx-r14               INTEGER (0.. maxFreqV2X-1-r14)  OPTIONAL,
    v2x-TypeTxSync-r14                  SL-TypeTxSync-r14               OPTIONAL,
    v2x-DestinationInfoList-r14 }       SL-DestinationInfoList-r12      OPTIONAL
}
-- ASN1STOP
```

| SidelinkUEInformation field descriptions |
| --- |
| carrierFreqCommTx
Indicates the index of the frequency on which the UE is interested to transmit V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency.
commRxInterestedFreq
Indicates the frequency on which the UE is interested to receive sidelink communication.
commTxResourceReq
Indicates the frequency on which the UE is interested to transmit non-relay related sidelink communication as well as the one-to-many sidelink communication transmission destination(s) for which the UE requests E-UTRAN to assign dedicated resources. NOTE 1.
reliabilityInfoListSL
Indicates the reliability(ies) (i.e., PPPRs [9]) associated with the reported traffic to be transmitted for V2X sidelink communication.
v2x-CommRxInterestedFreqList
Indicates the index(es) of the frequency(ies) on which the UE is interested to receive V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency.
carrierFreqCommTx
Indicates the index of the frequency on which the UE is interested to transmit V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency.
v2x-DestinationInfoList
Indicates the destination(s) for V2X sidelink communication.
v2x-TypeTxSync
Indicates the synchronization reference used by the UE. |

3GPP TS 23.287 stated:

5.2.1.4 Unicast Mode Communication Over PC5 Reference Point

Unicast mode of communication is only supported over NR based PC5 reference point. FIG. 5.2.1.4-1 illustrates an example of PC5 unicast links.

[FIG. 5.2.1.4-1 of 3GPP TR 23.786 V1.0.0, entitled "Example of PC5 Unicast Links", is reproduced as FIG. 7]

The following principles apply when the V2X communication is carried over PC5 unicast link:

- A PC5 unicast link between two UEs allows V2X communication between one or more pairs of peer V2X services in these UEs. All V2X services in the UE using the same PC5 unicast link use the same Application Layer ID.
- NOTE 1: An Application Layer ID may change in time as described in clauses 5.6.1.1 and 6.3.3.2, due to privacy. This does not cause a re-establishment of a PC5 unicast link.
- One PC5 unicast link supports one or more V2X services (e.g. PSIDs or ITS-AIDS) if these V2X services are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.
- NOTE 2: A source UE is not required to know whether different target Application Layer IDs over different PC5 unicast links belong to the same target UE.
- A PC5 unicast link supports V2X communication using a single network layer protocol e.g. IP or non-IP.
- A PC5 unicast link supports per-flow QoS model as specified in clause 5.4.1.

When the Application layer in the UE initiates data transfer for a V2X service which requires unicast mode of communication over PC5 reference point:

- the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service as specified in clause 6.3.3.4; otherwise
- the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:

- service type(s) (e.g. PSID or ITS-AID), Application Layer ID and Layer-2 ID of UE A; and
- Application Layer ID and Layer-2 ID of UE B; and
- network layer protocol used on the PC5 unicast link; and
- for each V2X service, a set of PC5 QoS Flow Identifier(s) (PFI(s)). Each PFI is associated with QoS parameters (i.e. PQI and optionally Range).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

The Unicast Link Profile shall be updated accordingly after a Layer-2 link modification for an established PC5 unicast link as specified in clause 6.3.3.4.

[ ... ]

5.4.1 QoS Handling for V2X Communication Over PC5 Reference Point
5.4.1.1 QoS Model
5.4.1.1.1 General Overview For LTE based PC5, the QoS handling is defined in TS 23.285 [8], based on ProSe Per-Packet Priority (PPPP) and ProSe Per-Packet Reliability (PPPR).

For NR based PC5, a QoS model similar to that defined in TS 23.501 [6] for Uu reference point is used, i.e. based on 5QIs, with additional parameter of Range. For the V2X communication over NR based PC5 reference point, a PC5 QoS Flow is associated with a PC5 QoS Rule that contains the PC5 QoS parameters as defined in clause 5.4.2. A set of standardized PC5 5QIs (PQI) are defined in clause 5.4.4. The UE may be configured with a set of default PC5 QoS parameters to use for the V2X services, as defined in clause 5.1.2.1. For NR based unicast, groupcast and broadcast PC5 communication, Per-flow QoS model for PC5 QoS management shall be applied. FIG. 5.4.1.1.1-1 illustrates an example mapping of Per-flow QoS model for NR PC5. Details of PC5 QoS Rules and PFI related operations are described in clauses 5.4.1.1.2 and 5.4.1.1.3.

Figure 8:
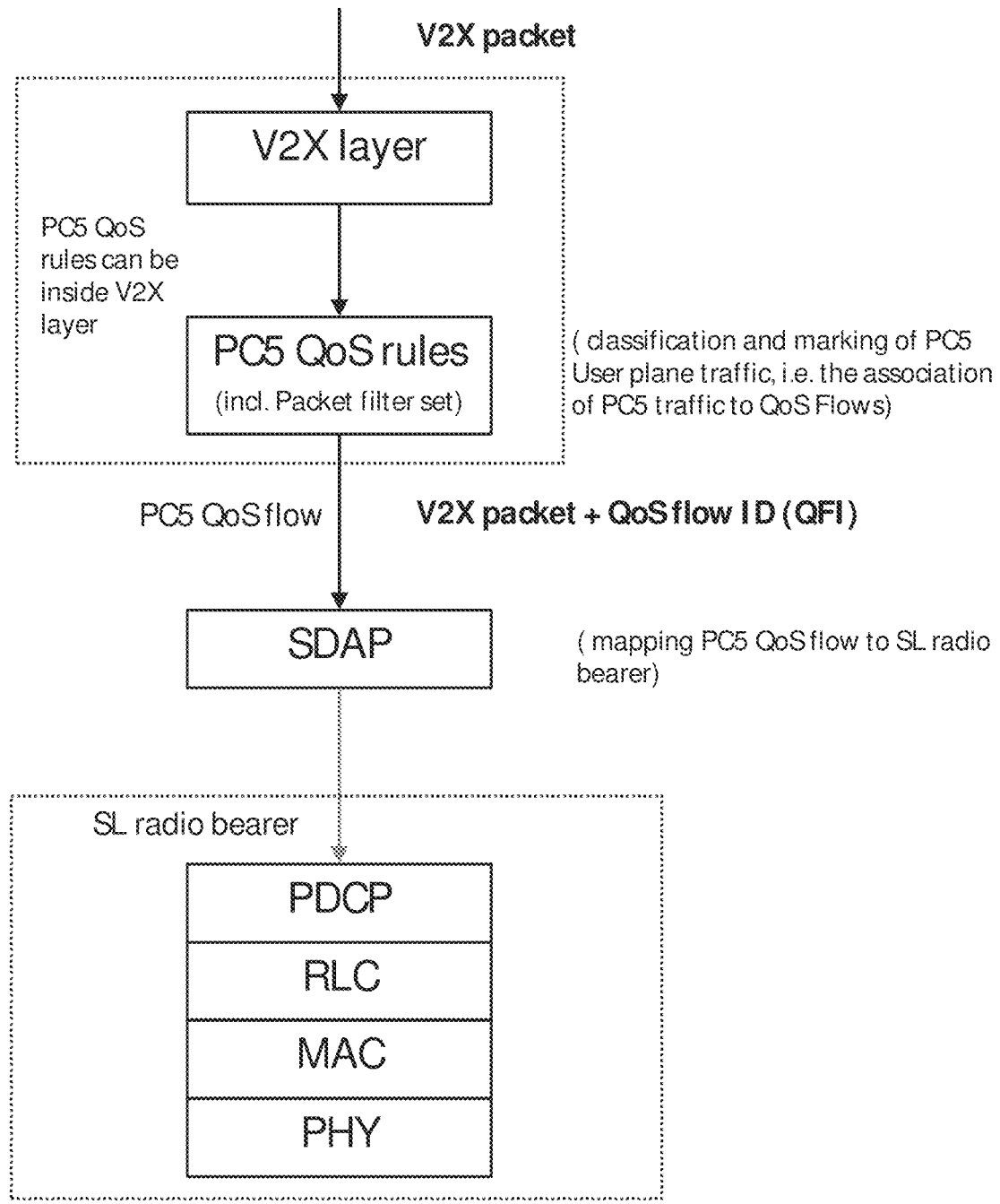
FIG. 8 is a reproduction of FIG. 5.4.1.1.1-1 of 3GPP TR 23.786 V1.0.0.

[FIG. 5.4.1.1.1-1 of 3GPP TR 23.786 V1.0.0, entitled "Per-Flow PC5 QoS Model for NR PC5", is reproduced as FIG. 8]

The following principles apply when the V2X communication is carried over PC5 reference point:

Application layer may set the V2X Application Requirements for the V2X communication, using either TS 23.285 [8] defined PPPP and PPPR model or the PQI and Range model. Depends on the type of PC5 reference point, i.e. LTE based or NR based, selected for the transmission, the UE may map the application layer provided V2X Application Requirements to the suitable QoS parameters to be passed to the lower layer. The mapping between the two QoS models is defined in clause 5.4.2. For V2X communication over NR based PC5, different V2X packets may require different QoS treatments. In that case, the V2X packets shall be sent from the V2X layer to the Access Stratum layer within PC5 QoS Flows identified by different PFIs.

When groupcast mode of V2X communication over NR based PC5 is used, a Range parameter is associated with the QoS parameters for the V2X communication. The Range may be provided by V2X application layer or use a default value mapped from the service type based on configuration as defined in clause 5.1.2.1. The Range indicates the minimum distance that the QoS parameters need to be fulfilled. The Range parameter is passed to AS layer together with the QoS parameters for dynamic control.

NR based PC5 supports three types of communication mode, i.e. broadcast, groupcast, and unicast. The QoS handling of these different modes are described in clauses 5.4.1.2 to 5.4.1.4.

The UE may handle broadcast, groupcast, and unicast traffic by taking all their priorities, e.g. indicated by PQIs, into account.

For broadcast and groupcast modes of V2X communication over NR based PC5, standardized PQI values are applied by the UE, as there is no signalling over PC5 reference point for these cases.

When network scheduled operation mode is used, the UE-PC5-AMBR for NR based PC5 applies to all types of communication modes, and is used by NG-RAN for capping the UE's NR based PC5 transmission in the resources management.

5.4.1.1.2 Deriving PC5 QoS Parameters and Assigning PFI for PC5 QoS Flow

The following description applies to for both network scheduled operation mode and UE autonomous resources selection mode.

When service data or request from the V2X application layer is received, the UE determines if there is any existing PC5 QoS Flow matching the service data or request, i.e. based on the PC5 QoS Rules for the existing PC5 QoS Flow(s).

If there is no PC5 QoS Flow matching the service data or request, the UE derives PC5 QoS parameters based on the V2X Application Requirements provided by the V2X application layer (if available) and the V2X service type (e.g. PSID or ITS-AID) according to the PC5 QoS mapping configuration defined in clause 5.1.2.1. The UE creates a new PC5 QoS Flow for the derived PC5 QoS parameters.

The UE then assigns a PFI and derives PC5 QoS Rule for this PC5 QoS Flow.

For V2X communication over NR PC5 reference point, the PC5 QoS Flow is the finest granularity of QoS differentiation in the same destination identified by Destination Layer-2 ID. User Plane traffic with the same PFI receives the same traffic forwarding treatment (e.g. scheduling, admission threshold). The PFI is unique within a same destination.

Editor's note: It is FFS whether to handle same PC5 QoS parameters with same destination L2 ID for a V2X service using different communication modes (e.g. broadcast, groupcast, unicast) as separate PC5 QoS Flows.

5.4.1.1.3 Handling of PC5 QoS Flows Based on PC5 QoS Rules

For each communication mode (e.g. broadcast, groupcast, unicast), the UE maintains the mappings of PFIs to the PC5 QoS Context and PC5 QoS Rules per destination identified by Destination Layer-2 ID. A PC5 QoS Context includes PC5 QoS parameters (e.g. PQI and Range) and the V2X service type (e.g. PSID or ITS-AID). When the UE assigns a new PFI for V2X service, the UE stores it with the corresponding PC5 QoS Context and PC5 QoS Rules for the destination. When the UE releases the PFI, the UE removes the corresponding PC5 QoS Context and PC5 QoS Rules for the destination. For unicast, the Unicast Link Profile defined in clause 5.2.1.4 contains addition information mapped from PFI for unicast operation.

The PC5 QoS Rule contains the PFI of the associated PC5 QoS Flow, a precedence value, and a PC5 Packet Filter Set as defined in clause 5.4.1.1.4. The precedence value determines the order in which the PC5 QoS Rules are evaluated. The PC5 QoS Rule with lower precedence value is evaluated before those with the higher precedence values.

The V2X layer provides information for PC5 QoS operations per destination (e.g. identified by Destination Layer-2 ID) to AS layer for Per-flow QoS model operations as below:

1) To add a new PC5 QoS Flow or to modify any existing PC5 QoS Flow, the V2X layer provides the PFI, the corresponding PC5 QoS parameters and source/destination Layer-2 IDs for the PC5 QoS Flow to AS layer.

2) To remove any existing PC5 QoS Flow, the V2X layer provides the PFI and source/destination Layer-2 IDs for the PC5 QoS Flow to AS layer.

NOTE: 1) and 2) apply to broadcast and groupcast.

In addition, the V2X layer also provides the communication mode (e.g. broadcast, groupcast, unicast), radio frequencies, Tx Profile to the AS layer for the PC5 operation. The radio frequencies and Tx Profile are determined based on the V2X service type. The V2X layer ensures that V2X services (e.g. identified by PSID or ITS-AID) associated with different radio frequencies are classified into distinct PC5 QoS Flows.

FIG. 5.4.1.1.3-1 illustrated an example of the classification and marking of user plane traffic using the PC5 QoS Rules, and the mapping of PC5 QoS Flows to radio resources at access stratum layer.

Figure 9:
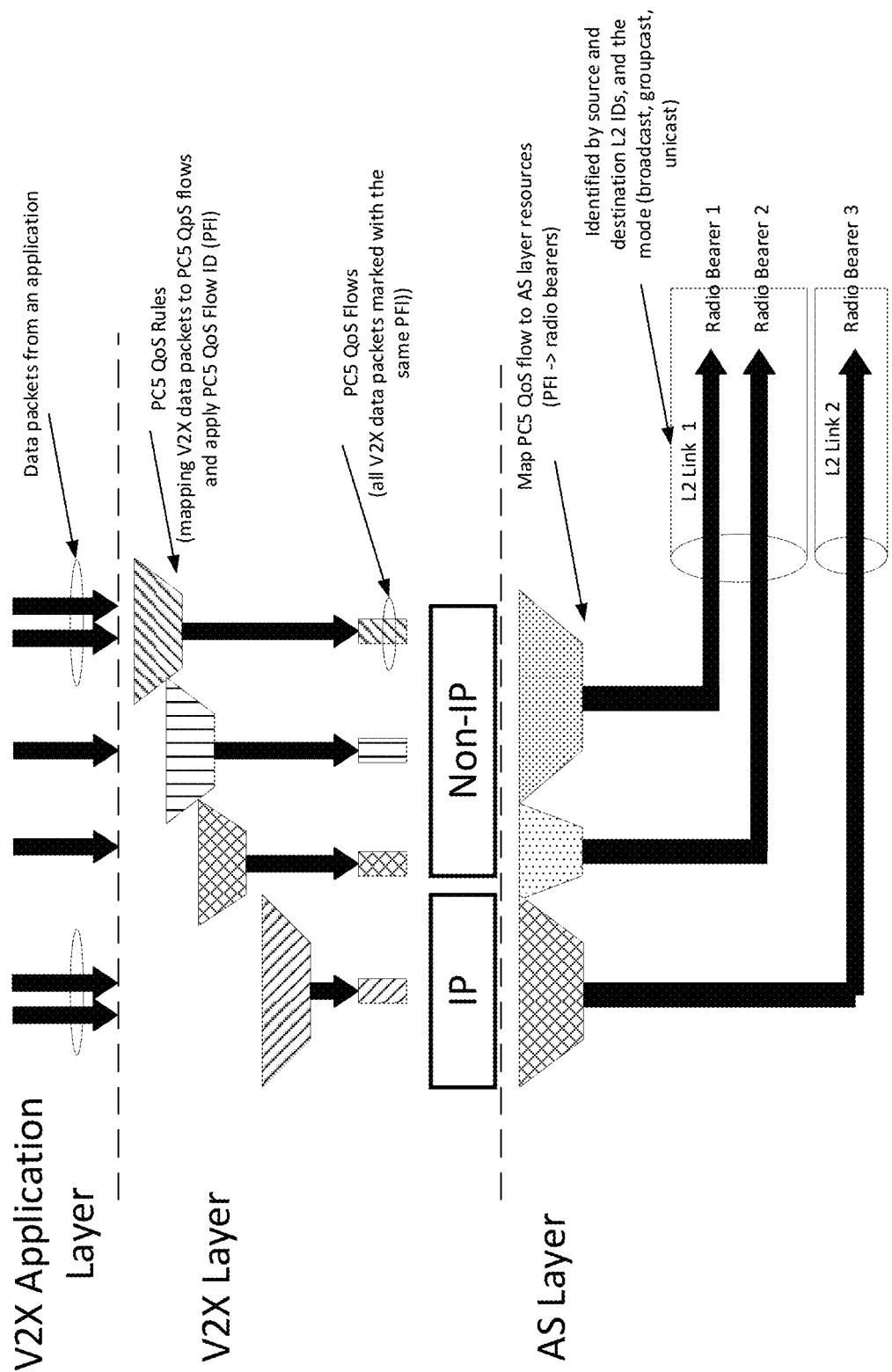
FIG. 9 is a reproduction of FIG. 5.4.1.1.3-1 of 3GPP TR 23.786 V1.0.0.

[FIG. 5.4.1.1.3-1 of 3GPP TR 23.786 V1.0.0, entitled "Handling of PC5 QoS Flows based on PC5 QoS Rules", is reproduced as FIG. 9]

As illustrated in FIG. 5.4.1.1.3-1, for a given pair of source and destination Layer-2 IDs, there can be multiple radio bearers, each corresponding to a different PC5 QoS level. The AS layer can determine the mapping of multiple PC5 QoS Flows to the same radio bearer based on the information provided. For broadcast and groupcast, the L2 link goes to all UEs in proximity identified by the destination Layer-2 ID.

6.1.1 User Plane for NR PC5 Reference Point Supporting V2X Services

Figure 10:
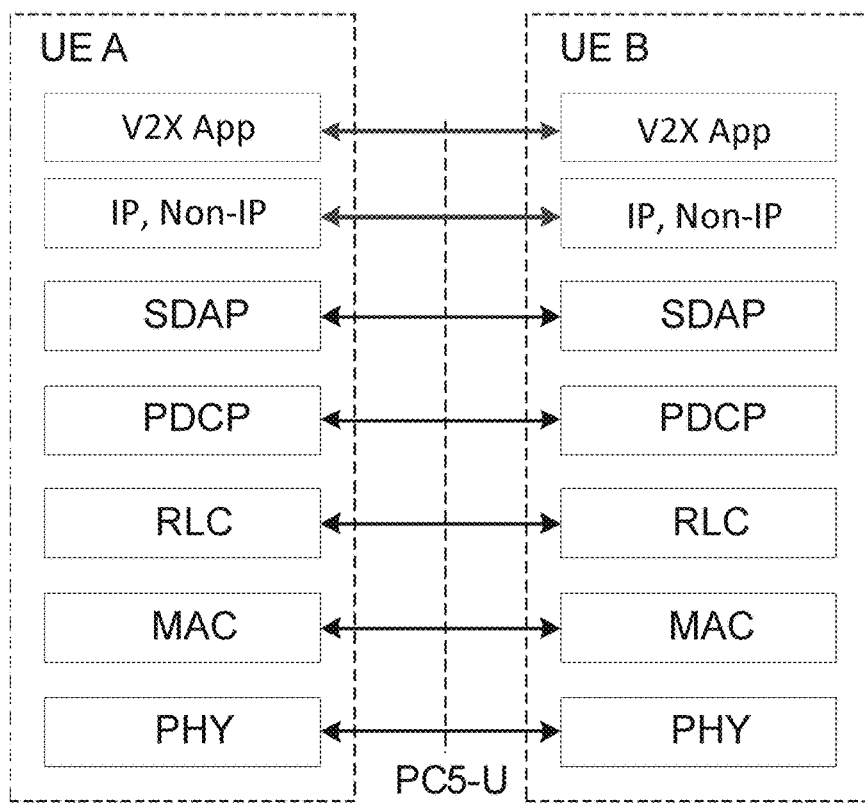
FIG. 10 is a reproduction of FIG. 6.1.1-1 of 3GPP TR 23.786 V1.0.0.

[FIG. 6.1.1-1 of 3GPP TR 23.786 V1.0.0, entitled "User Plane for PC5 interface", is reproduced as FIG. 10]

IP and Non-IP PDCP SDU types are supported for the V2X communication over PC5.

For IP PDCP SDU type, only IPv6 is supported. The IP address allocation and configuration are as defined in clause 5.6.1.1.

The Non-IP PDCP SDU contains a Non-IP Type header, which indicates the V2X message family used by the application layer, e.g. IEEE 1609 family's WSMP [18], ISO defined FNTP [19].

NOTE: The Non-IP Type header and allowed values will be defined in stage 3 specification.

[ . . . ]

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 11:
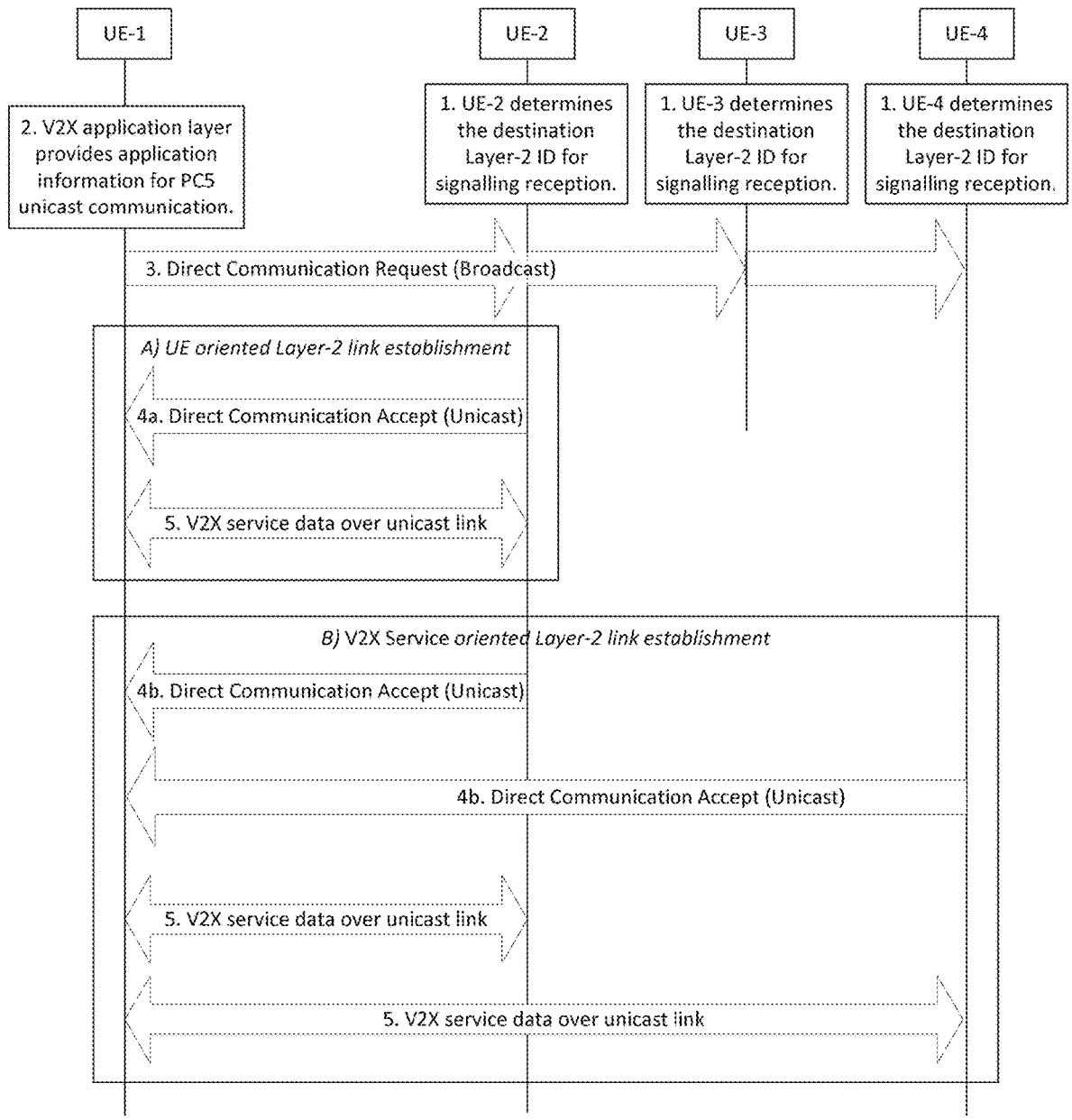
FIG. 11 is a reproduction of FIG. 6.3.3.1-1 of 3GPP TR 23.786 V1.0.0.

[FIG. 6.3.3.1-1 of 3GPP TR 23.786 V1.0.0, entitled "Layer-2 link establishment procedure", is reproduced as FIG. 11]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the service type(s) (e.g. PSID or ITS-AID) of the V2X application and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X Service (s) requesting Layer-2 link establishment (e.g. PSID (s) or ITS-AID(s)).

Indication whether IP communication is used.

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc).

The source Layer-2 ID and destination Layer-2 ID used to send the Direct Communication Request message are determined as specified in clauses 5.6.1.1 and 5.6.1.4.

UE-1 sends the Direct Communication Request message via PC5 broadcast using the source Layer-2 ID and the destination Layer-2 ID.

4. A Direct Communication Accept message is sent to UE-1 as below:

4a. (UE oriented Layer-2 link establishment) If the Target User Info is included in the Direct Communication Request message, the target UE, i.e. UE-2 responds with a Direct Communication Accept message.

4b. (V2X Service oriented Layer-2 link establishment) If the Target User Info is not included in the Direct Communication Request message, the UEs that are interested in using the announced V2X Service(s), so decide to establish Layer-2 link with UE-1 respond to the request by sending a Direct Communication Accept message (UE-2 and UE-4 in FIG. 6.3.3.1-1).

The Direct Communication Accept message includes:
  Source User Info: Application Layer ID of the UE sending the Direct Communication Accept message.
  QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).
  IP Address Configuration: For IP communication, IP address configuration is required for this link and indicates one of the following values:
    "IPv6 Router" if IPv6 address allocation mechanism is supported by the target UE, i.e., acting as an IPv6 Router; or
    "IPv6 address allocation not supported" if IPv6 address allocation mechanism is not supported by the target UE.
  Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.
  If both UEs (i.e. the initiating UE and the target UE) selected to use link-local IPv6 address, they shall disable the duplicate address detection defined in RFC 4862 [21].
NOTE 1: When either the initiating UE or the target UE indicates the support of IPv6 router, corresponding address configuration procedure would be carried out after the establishment of the layer 2 link, and the link-local IPv6 addresses are ignored.
  The source Layer-2 ID used to send the Direct Communication Accept message is determined as specified in clauses 5.6.1.1 and 5.6.1.4. The destination Layer-2 ID is set to the source Layer-2 ID of the received Direct Communication Request message.
  Upon receiving the Direct Communication Accept message from peer UE, UE-1 obtains the peer UE's Layer-2 ID for future communication, for signalling and data traffic for this unicast link.
  The V2X layer of the UE that established PC5 unicast link passes the PC5 Link Identifier assigned for the unicast link and PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.
Editor's Note: Steps for mutual authentication and security association establishment will be determined based on feedback from SA WG3.
5. V2X service data is transmitted over the established unicast link as below:
  The PC5 Link Identifier and PFI are provided to the AS layer, together with the V2X service data.
  UE-1 sends the V2X service data using the source Layer-2 ID (i.e. UE-1's Layer-2 ID for this unicast link) and the destination Layer-2 ID (i.e. the peer UE's Layer-2 ID for this unicast link).

Figure 12:
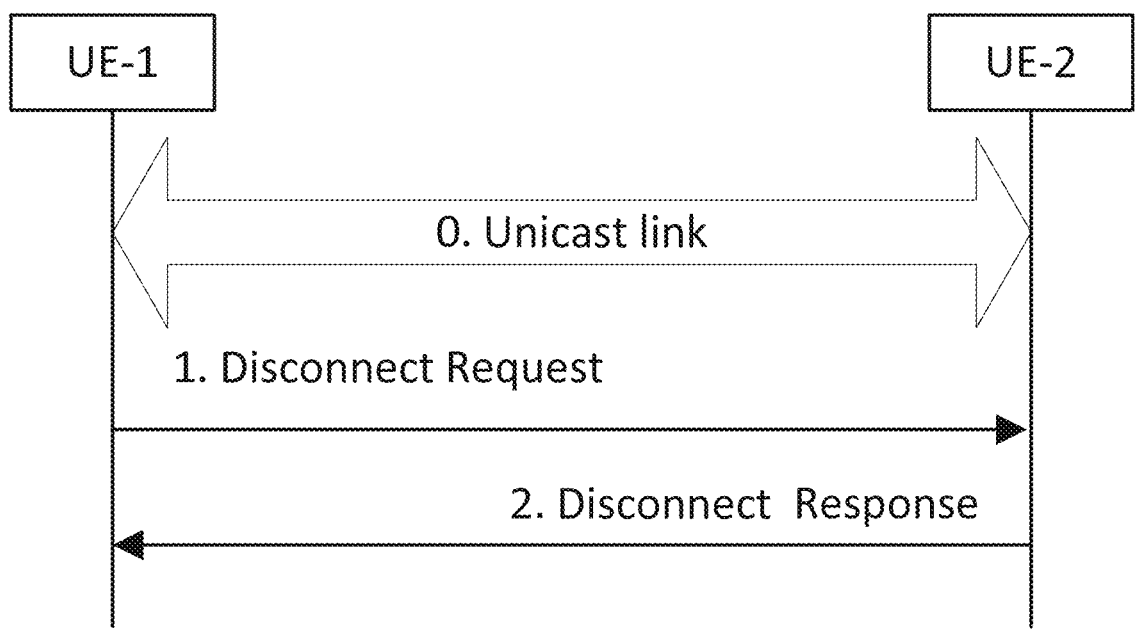
FIG. 12 is a reproduction of FIG. 6.3.3.3-1 of 3GPP TR 23.786 V1.0.0.
Figure 13:
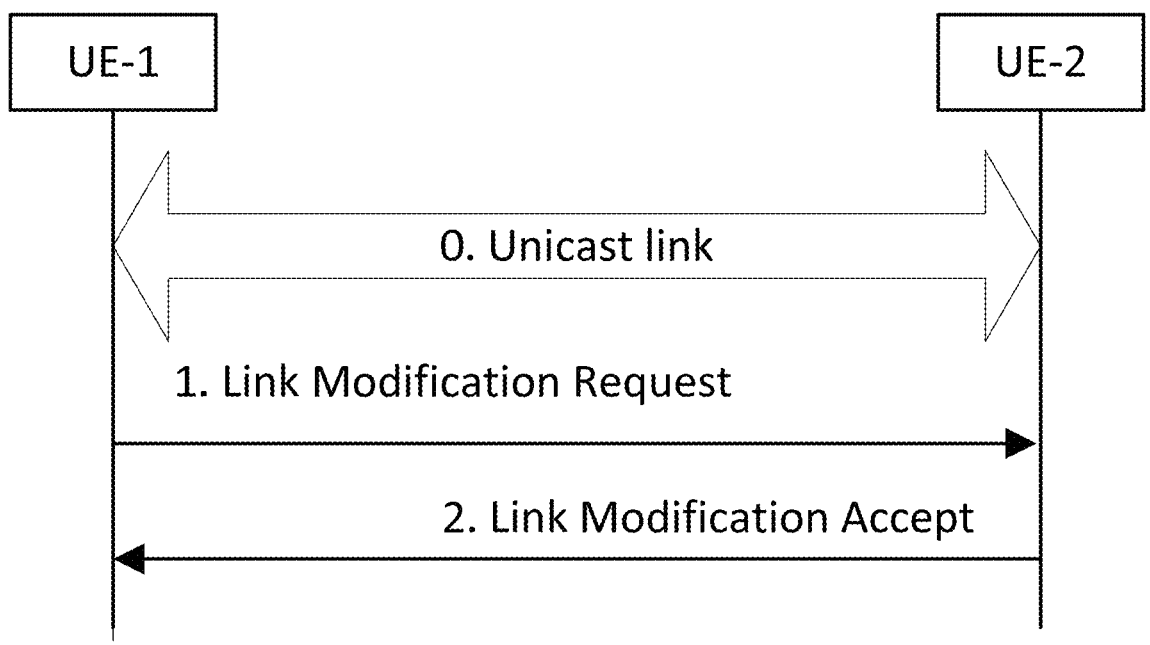
FIG. 13 is a reproduction of FIG. 6.3.3.4-1 of 3GPP TR 23.786 V1.0.0.

NOTE 2: PC5 unicast link is bi-directional, therefore the peer UE of UE-1 can send the V2X service data to UE-1 over the unicast link with UE-1.
Editor's Note: The parameters included in the Direct Communication Request/Accept messages can be updated depending on RAN WGs' decision on how the Direct Communication Request/Accept messages are sent by the AS layer (e.g. by using PC5-RRC signalling).
Editor's Note: Additional parameters included in the Direct Communication Request/Accept messages (e.g. security related) are FFS.
Editor's Note: Whether the unicast communication requires security protection at link layer will be determined based on feedback from SA WG3.
6.3.3.3 Layer-2 Link Release Over PC5 Reference Point
  FIG. 6.3.3.3-1 shows the layer-2 link release procedure over PC5 reference point.
  [FIG. 6.3.3.3-1 of 3GPP TR 23.786 V1.0.0, entitled "Layer-2 link release procedure", is reproduced as FIG. 12]
  0. UE-1 and UE-2 have a unicast link established as described in clause 6.3.3.1.
  1. UE-1 sends a Disconnect Request message to UE-2 in order to release the layer-2 link and deletes all context data associated with the layer-2 link.
  2. Upon reception of the Disconnect Request message UE-2 may respond with a Disconnect Response message and deletes all context data associated with the layer-2 link.
    The V2X layer of each UE informs the AS layer that the unicast link has been released. This enables the AS layer to delete the context related to the released unicast link.
6.3.3.4 Layer-2 Link Modification for a Unicast Link
  FIG. 6.3.3.4-1 shows the layer-2 link modification procedure for a unicast link. This procedure is used to:
    add new V2X service(s) to the existing PC5 unicast link.
    remove any V2X service(s) from the existing PC5 unicast link.
    modify any PC5 QoS Flow(s) in the existing PC5 unicast link.
  [FIG. 6.3.3.4-1 of 3GPP TR 23.786 V1.0.0, entitled "Layer-2 link modification procedure", is reproduced as FIG. 13]
  0. UE-1 and UE-2 have a unicast link established as described in clause 6.3.3.1.
  1. The V2X application layer in UE-1 provides application information for PC5 unicast communication. The application information includes the service type(s) (e.g. PSID or ITS-AID) of the V2X application(s) and the initiating UE's Application Layer ID. The target UE's Application Layer ID may be included in the application information. If UE-1 decides to reuse the existing PC5 unicast link as specified in clause 5.2.1.4, so decides to modify the unicast link established with UE-2, UE-1 sends a Link Modification Request to UE-2.
    The Link Modification Request message includes:
      a) To add new V2X service(s) to the existing PC5 unicast link:
        V2X Service Info: the information about V2X Service(s) to be added (e.g. PSID(s) or ITS-AID(s)).
        QoS Info: the information about PC5 QoS Flow(s) for each V2X Service to be added. For each PC5 QoS Flow, the PFI and the corresponding PC5 QoS parameters (i.e. PQI and conditionally other parameters such as MFBR/GFBR, etc).
b) To remove any V2X service(s) from the existing PC5 unicast link:
   V2X Service Info: the information about V2X Service(s) to be removed (e.g. PSID(s) or ITS-AID(s)).
c) To modify any PC5 QoS Flow(s) in the existing PC5 unicast link:
   QoS Info: the information about PC5 QoS Flow(s) to be modified. For each PC5 QoS Flow, the PFI and the corresponding PC5 QoS parameters (i.e. PQI and conditionally other parameters such as MFBR/GFBR, etc).
2. UE-2 responds with a Link Modification Accept message.
   The Link Modification Accept message includes:
   For case a) and case c) described in step 1:
     QoS Info: the information about PC5 QoS Flow(s). For each PC5 QoS Flow, the PFI and the corresponding PC5 QoS parameters (i.e. PQI and conditionally other parameters such as MFBR/GFBR, etc).

The V2X layer of each UE provides information about the unicast link modification to the AS layer. This enables the AS layer to update the context related to the modified unicast link.

3GPP RAN2 #106 made following agreements:

| Agreements on NR SL QoS and SLRB configurations: |
| --- |
| 1: Stick to SI phase conclusion that SLRB configurations should be NW-configured and/or pre-configured for NR SL. |
| 2: For an RRC_CONNECTED UE, for transmission of a new PC5 QoS flow, it may report the QoS information of the PC5 QoS flow via RRC dedicated signalling to the gNB/ng-eNB. FFS on the exact timing about when UE initiates. |
| 3: For an RRC_CONNECTED UE, the gNB/ng-eNB may provide SLRB configurations and configure the mapping of PC5 QoS flow to SLRB via RRC dedicated signalling, based on the QoS information reported by the UE. The UE can establishes/reconfigures the SLRB only after receiving the SLRB configuration. FFS when the UE establishes/reconfigures the SLRB. |
| 4: FFS what the reported QoS information is (e.g. PFI, PC5 QoS profile, etc.) and what is used to realize the PC5 QoS flow to SLRB mapping (e.g. PFI to SLRB mapping, QoS profile to SLRB mapping, etc.), depending on SA2 conclusion on how PFI is assigned. |
| 5: For RRC_IDLE/INACTIVE UEs, the gNB/ng-eNB may provide SLRB configurations and configure the PC5 QoS profile to SLRB mapping via V2X-specific SIB. When an RRC_IDLE/INACTIVE UE initiates the transmission of a new PC5 QoS flow, it establishes the SLRB associated with the PC5 QoS profile of that flow based on SIB configuration. |
| 6: FFS how to describe each PC5 QoS profile in the SIB, pending SA2's final conclusion on what PC5 QoS parameters are included in a PC5 QoS profile. |
| 7: For OoC UEs, SLRB configurations and the mapping of PC5 QoS profile to SLRB are pre-configured. When an OoC UE initiates the transmission of a new PC5 QoS flow, it establishes the SLRB associated with the flow based on pre-configuration. |
| 8: FFS what is used to realize for PC5 QoS flow to SLRB mapping in pre-configuration (e.g. PFI to SLRB mapping, QoS profile to SLRB mapping, etc.), depending on SA2 conclusion on how PFI is assigned. |
| 9: For SL unicast of a UE, the NW-configured/pre-configured SLRBs configurations include the SLRB parameters that are only related to TX, as well as the SLRB parameters that are related to both TX and RX and need to be aligned with the peer UEs. |
| 10: For SL unicast, the initiating UE informs the peer UE of SLRB parameters that are related to both TX and RX and need to be aligned with the peer UEs. FFS on the detailed parameters. |
| 11: For SL unicast, do not allow a UE to configure "SLRB parameters only related to TX" for the peer UE in SL via PC5 RRC message. FFS how to handle SRLB parameters only related to RX. |
| 12: For SL groupcast and/or broadcast, the NW-configured/preconfigured SLRBs include the SLRB parameters that are only related to TX. |
| 13: Those SLRB parameters which are related to both TX and RX and thus need to be aligned between a UE and all its peer UE(s) should be fixed in the Spec for SL groupcast and broadcast. |
| 14: For SL broadcast, how to set SLRB parameters only related to RX is up to UE implementation. FFS for groupcast case. |
| 15: SLRB configurations should be (pre-)configured for SL unicast, groupcast/broadcast separately (e.g. SLRB-ConfigForUnicast, SLRB-ConfigForGroupcast, SLRB-ConfigForBroadcast). FFS on the need of separate SLRB configurations between groupcast and broadcast. |

3GPP TS 37.324 stated:

6.2.2.3 UL Data PDU with SDAP Header

FIG. 6.2.2.3-1 shows the format of SDAP Data PDU of UL with SDAP header being configured.

Figure 14:
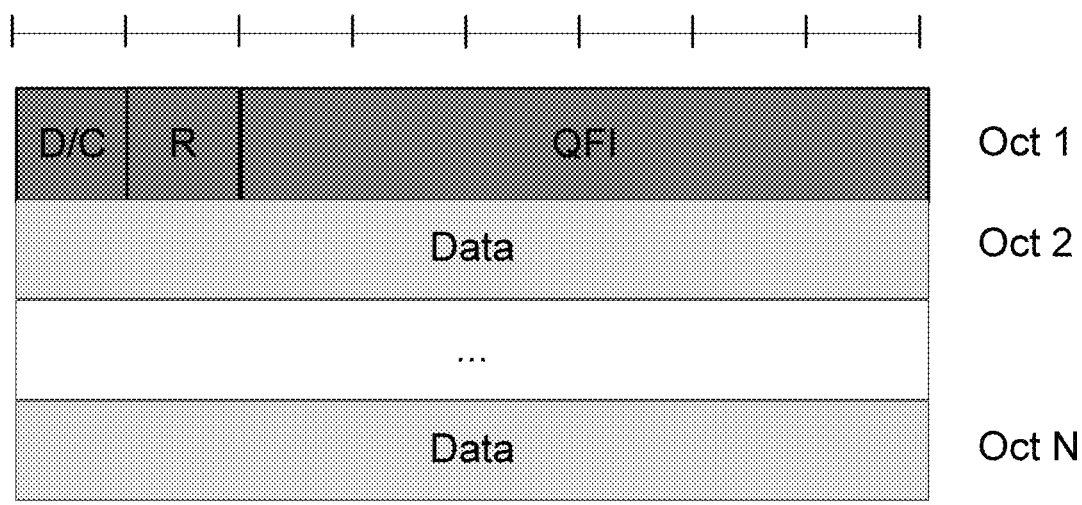
FIG. 14 is a reproduction of FIG. 6.2.2.3-1 of 3GPP TS 37.324 V15.1.0.

[FIG. 6.2.2.3-1 of 3GPP TS 37.324 V15.1.0, entitled "UL SDAP Data PDU format with SDAP header", is reproduced as FIG. 14]

[ . . . ]

6.3.4 QFI

Length: 6 bits

The QFI field indicates the ID of the QoS flow (3GPP TS 23.501 [4]) to which the SDAP PDU belongs.

3GPP TS 38.331 stated:

5.3.5.3 Reception of an RRCReconfiguration by the UE

The UE shall perform the following actions upon reception of the RRCReconfiguration:

[ . . . ]
  1> if the RRCReconfiguration message includes the radioBearerConfig:
    2> perform the radio bearer configuration according to 5.3.5.6;
[ . . . ]

5.3.5.6 Radio Bearer Configuration 5.3.5.6.1 General

The UE shall perform the following actions based on a received RadioBearerConfig IE:

[ . . . ]
  1> if the RadioBearerConfig includes the drb-ToReleaseList:
    2> perform DRB release as specified in 5.3.5.6.4;
  1> if the RadioBearerConfig includes the drb-ToAddModList:
    2> perform DRB addition or reconfiguration as specified in 5.3.5.6.5.
[ . . . ]

5.3.5.6.4 DRB Release

The UE shall:
  1> for each drb-Identity value included in the drb-ToReleaseList that is part of the current UE configuration; or
  1> for each drb-Identity value that is to be released as the result of full configuration according to 5.3.5.11:
    2> release the PDCP entity and the drb-Identity;
    2> if SDAP entity associated with this DRB is configured:
      3> indicate the release of the DRB to SDAP entity associated with this DRB (TS 37.324 [24], clause 5.3.3);
    2> if the DRB is associated with an eps-Beareridentity:
      3> if a new bearer is not added either with NR or E-UTRA with same eps-Beareridentity:
        4> indicate the release of the DRB and the eps-Beareridentity of the released DRB to upper layers.

NOTE 1: The UE does not consider the message as erroneous if the drb-ToReleaseList includes any drb-Identity value that is not part of the current UE configuration.

NOTE 2: Whether or not the RLC and MAC entities associated with this PDCP entity are reset or released is determined by the CellGroupConfig.

5.3.5.6.5 DRB Addition/Modification

The UE shall:
  1> for each drb-Identity value included in the drb-ToAddModList that is not part of the current UE configuration (DRB establishment including the case when full configuration option is used):
    2> establish a PDCP entity and configure it in accordance with the received pdcp-Config;
    2> if the PDCP entity of this DRB is not configured with cipheringDisabled:
      3> if target RAT of handover is E-UTRA/5GC; or
      3> if the UE is connected to E-UTRA/5GC:
        4> if the UE is capable of E-UTRA/5GC but not capable of NGEN-DC:
          5> configure the PDCP entity with the ciphering algorithm and $K_{UPenc}$ key configured/derived as specified in TS 36.331 [10];
        4> else (i.e., a UE capable of NGEN-DC):
          5> configure the PDCP entity with the security algorithms according to securityConfig and apply the keys ($K_{UPenc}$ and $K_{UPint}$) associated with the master key ($K_{eNB}$) or secondary key (S-$K_{gNB}$) as indicated in keyToUse, if applicable;
      3> else (i.e., UE connected to NR or UE in EN-DC):
        4> configure the PDCP entity with the ciphering algorithms according to securityConfig and apply the $K_{UPenc}$ key associated with the master key ($K_{eNB}$/$K_{gNB}$) or the secondary key (S-$K_{gNB}$/S-$K_{eNB}$) as indicated in keyToUse;
    2> if the PDCP entity of this DRB is configured with integrityProtection:
      3> configure the PDCP entity with the integrity protection algorithms according to securityConfig and apply the $K_{UPint}$ key associated with the master ($K_{eNB}$/$K_{gNB}$) or the secondary key (S-$K_{gNB}$/S-$K_{eNB}$) as indicated in keyToUse;
    2> if an sdap-Config is included:
      3> if an SDAP entity with the received pdu-Session does not exist:
        4> establish an SDAP entity as specified in TS 37.324 [24] clause 5.1.1;
        4> if an SDAP entity with the received pdu-Session did not exist prior to receiving this reconfiguration:
          5> indicate the establishment of the user plane resources for the pdu-Session to upper layers;
      3> configure the SDAP entity in accordance with the received sdap-Config as specified in TS 37.324 [24] and associate the DRB with the SDAP entity;
    2> if the DRB is associated with an eps-Beareridentity:
      3> if the DRB was configured with the same eps-Beareridentity either by NR or E-UTRA prior to receiving this reconfiguration:
        4> associate the established DRB with the corresponding eps-Beareridentity;
      3> else:
        4> indicate the establishment of the DRB(s) and the eps-Beareridentity of the established DRB(s) to upper layers;
  1> for each drb-Identity value included in the drb-ToAddModList that is part of the current UE configuration:
    2> if the reestablishPDCP is set:
      3> if target RAT of handover is E-UTRA/5GC; or
      3> if the UE is connected to E-UTRA/5GC:
        4> if the UE is capable of E-UTRA/5GC but not capable of NGEN-DC:
          5> if the PDCP entity of this DRB is not configured with cipheringDisabled:
            6> configure the PDCP entity with the ciphering algorithm and $K_{upenc}$ key configured/derived as specified in TS 36.331 [10], clause 5.4.2.3, i.e. the ciphering configuration shall be applied to all subsequent PDCP PDUs received and sent by the UE;
        4> else (i.e., a UE capable of NGEN-DC):
          5> if the PDCP entity of this DRB is not configured with cipheringDisabled:
            6> configure the PDCP entity with the ciphering algorithm and $K_{upenc}$ key associated with the master key ($K_{eNB}$) or the secondary key (S-$K_{gNB}$), as indicated in keyToUse, i.e. the ciphering configuration shall be applied to all subsequent PDCP PDUs received and sent by the UE;
3> else (i.e., UE connected to NR or UE in EN-DC):
  4> if the PDCP entity of this DRB is not configured with cipheringDisabled:
    5> configure the PDCP entity with the ciphering algorithm and $K_{UPenc}$ key associated with the master key ($K_{eNB}/K_{gNB}$) or the secondary key (S-$K_{gNB}$/S-$K_{eNB}$), as indicated in keyToUse, i.e. the ciphering configuration shall be applied to all subsequent PDCP PDUs received and sent by the UE;
  4> if the PDCP entity of this DRB is configured with integrityProtection:
    5> configure the PDCP entity with the integrity protection algorithms according to security-Config and apply the $K_{UPint}$ key associated with the master key ($K_{eNB}/K_{gNB}$) or the secondary key (S-$K_{gNB}$/S-$K_{eNB}$) as indicated in keyToUse;
3> if drb-ContinueROHC is included in pdcp-Config:
  4> indicate to lower layer that drb-ContinueROHC is configured;
3> re-establish the PDCP entity of this DRB as specified in TS 38.323 [5], clause 5.1.2;
2> else, if the recoverPDCP is set:
  3> trigger the PDCP entity of this DRB to perform data recovery as specified in TS 38.323 [5];
2> if the pdcp-Config is included:
  3> reconfigure the PDCP entity in accordance with the received pdcp-Config.
2> if the sdap-Config is included:
  3> reconfigure the SDAP entity in accordance with the received sdap-Config as specified in TS37.324 [24];
  3> for each QFI value added in mappedQoS-FlowsToAdd, if the QFI value is previously configured, the QFI value is released from the old DRB;
NOTE 1: Void.
NOTE 2: When determining whether a drb-Identity value is part of the current UE configuration, the UE does not distinguish which RadioBearerConfig and DRB-ToAddModList that DRB was originally configured in. To re-associate a DRB with a different key ($K_{eNB}$ to S-$K_{gNB}$ or vice versa), the network provides the drb-Identity value in the (target) drb-ToAddModList and sets the reestablishPDCP flag. The network does not list the drb-Identity in the (source) drb-ToReleaseList.
NOTE 3: When setting the reestablishPDCP flag for a radio bearer, the network ensures that the RLC receiver entities do not deliver old PDCP PDUs to the re-established PDCP entity. It does that e.g. by triggering a reconfiguration with sync of the cell group hosting the old RLC entity or by releasing the old RLC entity.
NOTE 4: In this specification, UE configuration refers to the parameters configured by NR RRC unless otherwise stated.
NOTE 5: Ciphering and integrity protection can be enabled or disabled for a DRB. The enabling/disabling of ciphering or integrity protection can be changed only by releasing and adding the DRB.
[ . . . ]
SDAP-Config The IE SDAP-Config is used to set the configurable SDAP parameters for a data radio bearer. All configured instances of SDAP-Config with the same value of pdu-Session correspond to the same SDAP entity as specified in TS 37.324 [24].

SDAP-Config Information Element

```
-- ASN1START
-- TAG-SDAP-CONFIG-START
SDAP-Config ::=            SEQUENCE {
    pdu-Session                PDU-SessionID,
    sdap-HeaderDL              ENUMERATED {present, absent},
    sdap-HeaderUL              ENUMERATED {present, absent},
    defaultDRB                 BOOLEAN,
    mappedQoS-FlowsToAdd       SEQUENCE (SIZE (1..maxNrofQFIs}} OF QFI
OPTIONAL, -- Need N
    mappedQoS-FlowsToRelease   SEQUENCE (SIZE (1..maxNrofQFIs}} OF QFI
OPTIONAL, -- Need N
    ...
}
QFI ::=                    INTEGER (0..maxQFI)
PDU-SessionID ::=          INTEGER (0..255)
-- TAG-SDAP-CONFIG-STOP
-- ASN1STOP
```

SDAP-Config field descriptions defaultDRB
Indicates whether or not this is the default DRB for this PDU session. Among all configured instances of SDAP-Config with the same value of pdu-Session, this field shall be set to true in at most one instance of SDAP-Config and to false in all other instances.
mappedQoS-FlowsToAdd
Indicates the list of QFIs of UL QoS flows of the PDU session to be additionally mapped to this DRB. A QFI value can be included at most once in all configured instances of SDAP-Config with the same value of pdu-Session. For QoS flow remapping, the QFI value of the remapped QoS flow is only included in mappedQoS-FlowsToAdd in sdap-Config corresponding to the new DRB and not included in mappedQoS-FlowsToRelease in sdap-Config corresponding to the old DRB.

| SDAP-Config field descriptions |
| --- |
| mappedQoS-FlowsToRelease<br>Indicates the list of QFIs of QoS flows of the PDU session to be released from existing QoS flow to DRB mapping of this DRB.<br>pdu-Session<br>Identity of the PDU session whose QoS flows are mapped to the DRB.<br>sdap-HeaderUL<br>Indicates whether or not a SDAP header is present for UL data on this DRB. The field cannot be changed after a DRB is established. The network sets this field to present if the field defaultDRB is set to true.<br>sdap-HeaderDL<br>Indicates whether or not a SDAP header is present for DL data on this DRB. The field cannot be changed after a DRB is established. |

According to 3GPP TS 23.287, a paired UEs may establish one or more unicast links between each other. Each unicast link is associated with an Application Layer ID of a UE and an Application Layer ID of a peer UE. For each unicast link, one or more V2X services may transfer traffic through one unicast link. Since different V2X services require different QoS requirements, each V2X service may have one or more PC5 QoS flows for traffic transfer. Therefore, each unicast link may have one or more PC5 QoS flows belonging to different V2X services. Besides, each UE needs to maintain a mapping of PC5 QoS flow identity (PFI) to PC5 QoS Context and PC5 QoS Rules per destination associated with the unicast link. PFI is assigned by the UE. The PC5 QoS Context includes PC5 QoS parameters (e.g. PQI, etc.), an identity used to identify a V2X service (e.g. PSID) and/or an identity used to identify a V2X application (e.g. ITS-AID) offering the V2X service for the associated PFI.

Here is an example. UE1 and UE2 establish two unicast links, Unicast Link #1 and #2. UE2 uses a first Layer-2 ID as a Destination Layer-2 ID 1 for Unicast Link #1 and a second Layer-2 ID as another Destination Layer-2 ID 2 for Unicast Link #2. On the Unicast Link #1, two V2X services are initialized, V2X Service A and V2X Service B. On the Unicast Link #2, two V2X services are initialized, V2X Service C and V2X Service D. V2X Service A has two PC5 QoS flows, PFI1 and PFI2. V2X Service B has one PC5 QoS flow, PFI3. V2X Service C has one PC5 QoS flow, PFI4. And V2X Service D has one PC5 QoS flow, PFI5.

According to the 3GPP RAN2 #106 Chairman's note, the UE, for transmission of a new PC5 QoS flow, may report the QoS information (e.g. PQI) of the PC5 QoS flow to the gNB. And then the gNB may provide a SLRB configuration and configure a mapping of PC5 QoS flow to SLRB to the UE based on the QoS information reported by the UE. Therefore, the UE may transmit a request message to gNB to request a SLRB configuration for a PC5 QoS flow of one V2X service. In case there are multiple V2X services supported over the same unicast link, how to release SLRB(s) associated with a V2X service should be considered when this V2X service is deactivated.

Since the mapping of PFIs to PC5 QoS Context and PC5 QoS Rules is per destination, UE1 may send an identity or index of a destination associated with one or more PC5 QoS flows to the gNB to request SLRB configuration. The destination identity or index could be included in a request for SLRB configuration. The destination identity or index could be included in a SidelinkUEInformation. The destination index may indicate an entry in a destination list. Each entry in the destination list may include a destination (identified by a Destination Layer-2 ID). Based on the PQIs associated with the PC5 QoS flows, the gNB configures the mapping of PFIs and SLRBs. The relationship among destination identity/index, PFI, and PQI could be illustrated in Table 1 shown in FIG. 15.

In this example, the gNB may provide mappings of PFIs to SLRBs as follows:
  PFI1-to-SLRB1 (for V2X Service A)
  PFI2-to-SLRB2 (for V2X Service A)
  PFI3-to-SLRB2 (for V2X Service B)
  PFI4-to-SLRB3 (for V2X Service C)
  PFI5-to-SLRB4 (for V2X Service D)
  PFI2 and PFI3 belong to different V2X services but the gNB may map them to SLRB2 due to e.g. PQI 2 and PQI 3 share similar PC5 QoS requirements.

It is also possible that the gNB could configure the UE1 to use different SLRBs for serving different V2X services. In other words, each SLRB is used to serve only one V2X service. To achieve this, including V2X service type (e.g. identity of a V2X service (PSID) or identity of a V2X application offering a V2X service (ITS-AID)) in each entry of the destination list for grouping PFIs is considered. For example, each destination in one entry of the destination list may be associated with a PFI list, and each entry of the PFI list includes an identity of PC5 QoS flow, a PQI and a V2X service type. The relationship among destination identity or index, PFI, PQI and V2X service type could be illustrated in Table 2a shown in FIG. 16.

Since V2X service type could be the identity of a V2X service or the identity of the V2X application offering the V2X service that needs more bits for transmission, alternative for reducing signalling overhead can be considered. The UE could group one or more PC5 QoS flows belonging to the same V2X service as one set of PC5 QoS flow e.g. one PFI set. Each index or identity used to identify one PFI set could be assigned by the UE. Therefore, bits required for indicating one PFI set will be less than bits required for indicating one V2X service type. The index or identity used to identify one PFI set can be included in each entry of the destination list. For example, each destination in one entry of the destination list may be associated with a PFI list, and each entry of the PFI list includes an identity of PC5 QoS flow, a PQI and an identity or index of one PFI set. The relationship among destination identity or index, PFI, PQI and PFI set could be illustrated in Table 2b shown in FIG. 16.

Based on above concepts, the gNB can configure the mapping of PFIs and SLRBs as follows:
  PFI1-to-SLRB1 (for V2X Service A)
  PFI2-to-SLRB2 (for V2X Service A)
  PFI3-to-SLRB3 (for V2X Service B)
  PFI4-to-SLRB4 (for V2X Service C)
  PFI5-to-SLRB5 (for V2X Service D)

When a V2X service is terminated or deactivated, the PFI(s) associated with the V2X service will be not needed and the SLRB(s) corresponding to the PFI(s) should be released. For example, when the UE1 terminates the V2X Service A, the PC5 QoS flows PFI1 and PFI 2 are not needed and the SLRB(s) used to serve PFI1 and PFI2 should be released. In above examples, SLRB1 used to serve PFI1 should be released. If SLRB2 is used to serve only PFI2, it should be released; otherwise, if SLRB2 is used to serve PFI2 and PFI3, it should not be released because SLRB2 can be still used for traffic transfer of V2X Service B. The gNB needs to know which V2X service has been terminated or deactivated by the UE or which SLRB(s) is not needed by the UE.

In one alternative, the UE may indicate particular PC5 QoS flow(s) for a destination is not needed by updating the entry of the destination in the destination list (e.g. removing the PFI(s) associated with the destination and/or any information associated with the PFI(s)). If the destination has only one V2X service that is terminated, the entry of the destination can be removed from the updated destination list. In the above example, UE1 can remove PFI1 and PFI2 from the corresponding entry in the destination list and sends this updated destination list to the gNB. Based on the updated destination list, the gNB can release the SLRB(s) used to serve PFI1 and PFI2.

In one embodiment, the UE could release a SLRB and some transmission related configuration (e.g. a logical channel associated with the SLRB, mapping of the logical channel to a logical channel group, and etc.) by itself if the SLRB serves one or more PC5 QoS flows belonging to the same V2X service. Furthermore, the UE may not release a SLRB and some transmission related configuration (e.g. a logical channel associated with the SLRB, mapping of the logical channel to a logical channel group, and etc.) by itself if the SLRB serves one or more PC5 QoS flows belonging to different V2X services.

In one embodiment, the UE could release a SLRB and some transmission related configuration (e.g. a logical channel associated with the SLRB, mapping of the logical channel to a logical channel group, and etc.) based on an indication received from the gNB after the updated destination list is transmitted to the gNB. The indication could indicate which SLRB should be released. The indication could indicate the SLRB to be released belongs to which destination. The indication could be a RRC (Radio Resource Control) reconfiguration message.

Examples of the updated destination list could be illustrated in the following Tables 3a-3c shown in FIG. 17.

Alternatively, the UE could indicate the gNB about which PC5 QoS flow or which SLRB to be released. The UE could transmit a release message to the gNB for releasing SLRB configuration when a V2X service is terminated. This concept may also be applied to cases where there is only one V2X service supported on the unicast link. In this situation, each PC5 QoS flow may be deactivated or terminated by upper layers individually and thus the SLRB mapped to the concerned PC5 QoS flow(s) may be released.

The release message may indicate a destination (via e.g. Destination Layer-2 ID) or a unicast link (via e.g. PC5 Link Identifier) for associating the PC5 QoS flow or SLRB to be released. The release message may include one or more following information:
  PFI;
  SLRB ID;
  V2X service type (V2X service identity or V2X service index); and
  PFI set.

A V2X service identity is an identity of the V2X service, which may be a PSID. In addition, a UE may assign an index to a V2X service when it is activated in the UE. For example, the UE may assign index "1" to the first V2X service and index "2" to the second V2X service. A V2X service index is expressed with less bits than a V2X service identity and thus could consume less signalling overhead.

By this way, the UE does not need to send the whole destination list again so that signalling overhead can be reduced. Examples of the release message could be illustrated in Tables 4a-4d shown in FIG. 18 respectively, where the second entry in Table 4b (shown in FIG. 18) is present if SLRB2 serves multiple V2X services and is not present if SLRB2 serves only one V2X service.

Alternatively, the destination could not be included in the release message if the PFI to be removed is differentiable among different destinations. Example of the release message could be illustrated in Table 5a shown in FIG. 19.

Alternatively, the destination could not be included in the release message if the SLRB to be released is differentiable among different destinations. Example of the release message could be illustrated in Table 5b shown in FIG. 19. The second entry in this table is present if SLRB2 serves multiple V2X services and is not present if SLRB2 serves only one V2X service.

Alternatively, the destination could not be included in the release message if the PFI to be removed is grouped based on V2X service type or PFI set. Examples of the release message could be illustrated in Tables 5c and 5d shown in FIG. 19.

Figure 20:
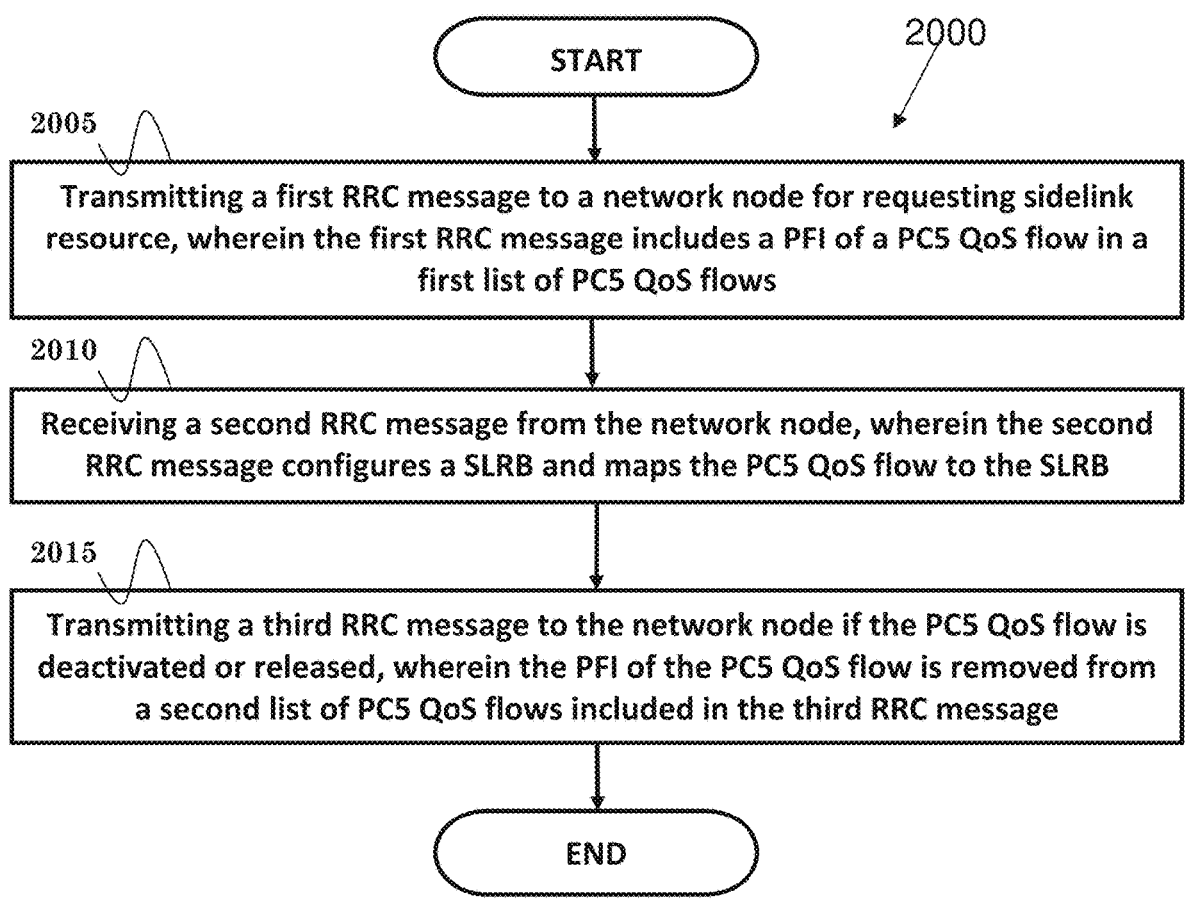
FIG. 20 is a flow chart according to one exemplary embodiment.

FIG. 20 is a flow chart 2000 according to one exemplary embodiment from the perspective of a first UE to indicate a network node for releasing SLRB or SL-DRB. In step 2005, the first UE transmits a first RRC message to a network node for requesting sidelink resource, wherein the first RRC message includes a PFI of a PC5 QoS flow in a first list of PC5 QoS flows. In step 2010, the first UE receives a second RRC message from the network node, wherein the second RRC message configures a SLRB and maps the PC5 QoS flow to the SLRB. In step 2015, the first UE transmits a third RRC message to the network node if the PC5 QoS flow is deactivated or released, wherein the PFI of the PC5 QoS flow is removed from a second list of PC5 QoS flows included in the third RRC message.

In one embodiment, the PC5 QoS flow could be transmitted on a PC5 unicast link and the PC5 unicast link is established between the first UE and a second UE. The first UE could also receive a fourth RRC message from the network node, wherein the fourth RRC message reconfigures the UE to release the SLRB. Furthermore, the first UE could release the SLRB according to the fourth RRC message.

In one embodiment, the PFI of the PC5 QoS flow may not be included in the second list of PC5 QoS flows. The first RRC message may include a destination Layer-2 ID associated with the PC5 unicast link. The destination Layer-2 ID may be a Layer-2 ID of the second UE.

In one embodiment, the first RRC message or the third RRC message could be a SidelinkUEInformation. The second RRC message or the fourth RRC message could be a RRC reconfiguration message.

In one embodiment, the network node could be a base station (e.g. gNB).

Referring back to FIGS. 3 and 4, in one exemplary embodiment of a first UE. The first UE 300 includes a program code 312 stored in the memory 310. The CPU 308 could execute program code 312 to enable the first UE (i) to transmit a first RRC message to a network node for requesting sidelink resource, wherein the first RRC message includes a PFI of a PC5 QoS flow in a first list of PC5 QoS flows, (ii) to receive a second RRC message from the network node, wherein the second RRC message configures a SLRB and maps the PC5 QoS flow to the SLRB, and (iii) to transmit a third RRC message to the network node if the PC5 QoS flow is deactivated or released, wherein the PFI of the PC5 QoS flow is removed from a second list of PC5 QoS flows included in the third RRC message. Furthermore, the CPU 308 can execute the program code 312 to perform all of the above-described actions and steps or others described herein.

Figure 21:
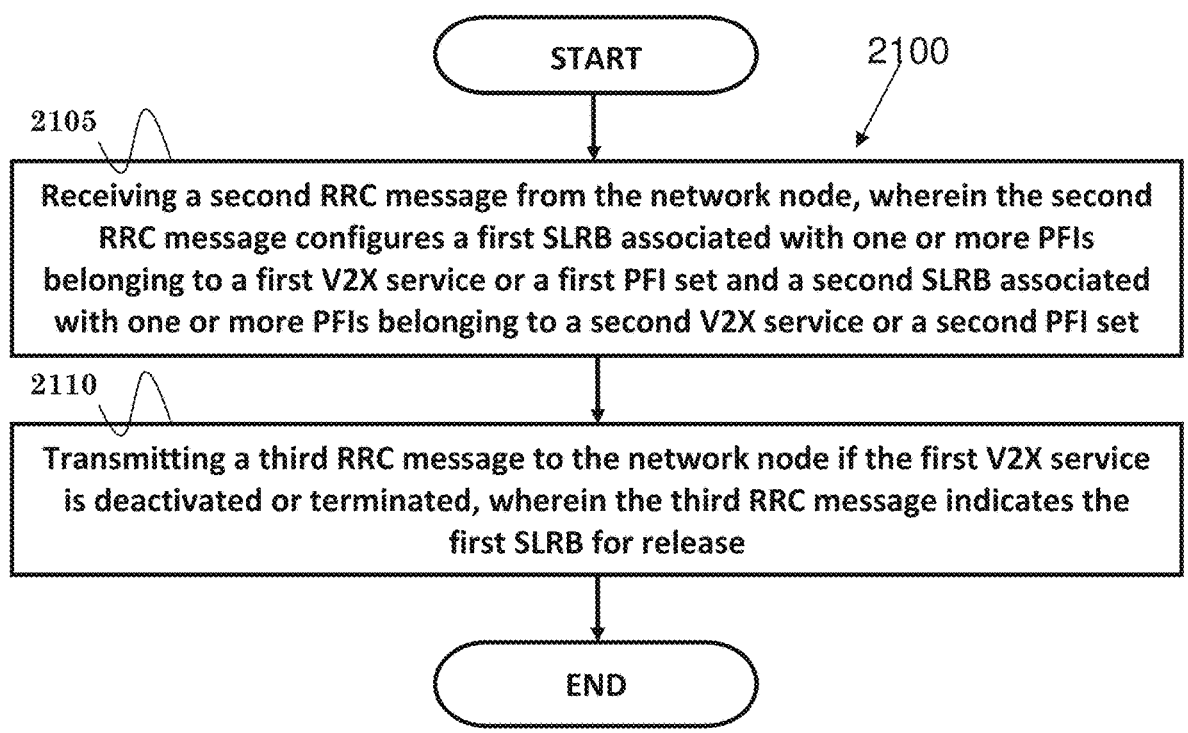
FIG. 21 is a flow chart according to one exemplary embodiment.

FIG. 21 is a flow chart 2100 according to one exemplary embodiment from the perspective of a UE to indicate a network node for releasing SLRB. In step 2105, the UE receives a second RRC message from the network node, wherein the second RRC message configures a first SLRB associated with one or more PFIs belonging to a first V2X service or a first PFI set and a second SLRB associated with one or more PFIs belonging to a second V2X service or a second PFI set. In step 2110, the UE transmits a third RRC message to the network node if the first V2X service is deactivated or terminated, wherein the third RRC message indicates the first SLRB for release.

In one embodiment, the UE could transmit a first RRC message to the network node, wherein the first RRC message includes the one or more PFIs associated with the first V2X service or the first PFI set and the one or more PFIs associated with the second V2X service or the second PFI set. The UE could also receive a fourth RRC message from the network node, wherein the fourth RRC message reconfigures the UE to release the first SLRB.

In one embodiment, the first RRC message may include a Layer-2 ID list. An entry of the Layer-2 ID list may include a first Layer-2 ID and a first PC5 QoS flow list associated with the first Layer-2 ID, and an entry of the first PC5 QoS flow list may indicate the first V2X service or the first PFI set. An entry of the Layer-2 ID list may also include a second Layer-2 ID and a second PC5 QoS flow list associated with the second Layer-2 ID, and an entry of the second PC5 QoS flow list may indicate the second V2X service or the second PFI set.

In one embodiment, the first Layer-2 ID could be the same as the second Layer-2 ID. The first PC5 QoS flow list could also be the same as the second PC5 QoS flow list. The first or second Layer-2 ID list could be a Source Layer-2 ID list or a Destination Layer-2 ID list. The first or second Layer-2 ID could also be a Source Layer-2 ID if the first/second Layer-2 ID belongs to the UE. The first or second Layer-2 ID could be a Destination Layer-2 ID if the first or second Layer-2 ID belongs to a peer UE of the UE.

In one embodiment, the first RRC message could be a request message for SLRB configuration. The first RRC message could also be a SidelinkUEInformation. The second or fourth RRC message could be a RRC reconfiguration message.

In one embodiment, the third RRC message could be a release message for SLRB configuration. The third RRC message may include the one or more PFIs associated with the second V2X service or the second PFI set, but may not include the one or more PFIs associated with the first V2X service or the first PFI set.

In one embodiment, the entry of the Layer-2 ID list including the first Layer-2 ID and the first PC5 QoS flow list could be removed from the Layer-2 ID list in the third RRC message. The entry of the first PC5 QoS flow list indicating the first V2X service or the first PFI set could be removed from the Layer-2 ID list in the third RRC message.

In one embodiment, the third RRC message may include an identity of the first SLRB. The third RRC message may also include an identity of the first V2X service or an identity or index of the first PFI set. The UE and the peer UE could establish a first unicast link for serving the first V2X service. The UE and the peer UE could also establish a second unicast link for serving the second V2X service. The third RRC message may include a first PC5 Link Identifier used to identify the first unicast link.

In one embodiment, the network node could be a base station (e.g. gNB).

Referring back to FIGS. 3 and 4, in one exemplary embodiment of a UE. The UE 300 includes a program code 312 stored in the memory 310. The CPU 308 could execute program code 312 to enable the UE (i) to receive a second RRC message from the network node, wherein the second RRC message configures a first SLRB associated with one or more PFIs belonging to a first V2X service or a first PFI set and a second SLRB associated with one or more PFIs belonging to a second V2X service or a second PFI set, and (ii) to transmit a third RRC message to the network node if the first V2X service is deactivated or terminated, wherein the third RRC message indicates the first SLRB for release. Furthermore, the CPU 308 can execute the program code 312 to perform all of the above-described actions and steps or others described herein.

Figure 22:
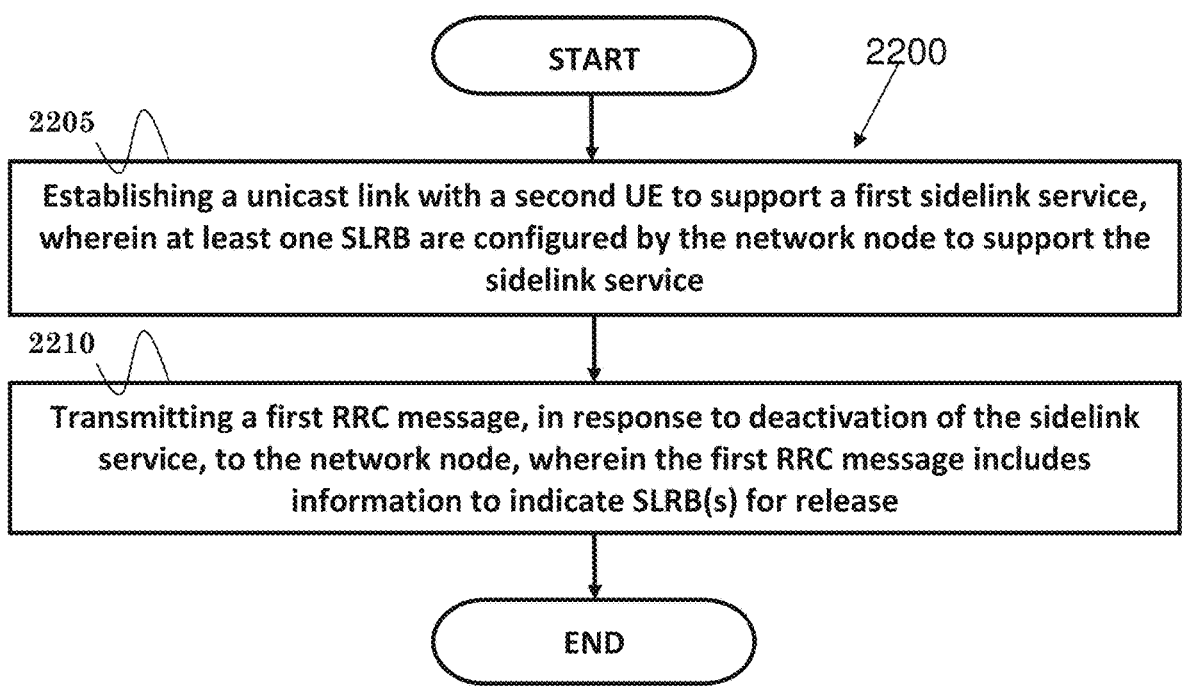
FIG. 22 is a flow chart according to one exemplary embodiment.

FIG. 22 is a flow chart 2200 according to one exemplary embodiment from the perspective of a first UE to indicate a network node to release SLRB. In step 2205, the first UE establishes a unicast link with a second UE to support a first sidelink service, wherein at least one SLRB are configured by the network node to support the sidelink service. In step 2210, the first UE transmits a first RRC message, in response to deactivation of the sidelink service, to the network node, wherein the first RRC message includes information to indicate SLRB(s) for release.

Referring back to FIGS. 3 and 4, in one exemplary embodiment of a first UE. The first UE 300 includes a program code 312 stored in the memory 310. The CPU 308 could execute program code 312 to enable the first UE (i) to establish a unicast link with a second UE to support a first sidelink service, wherein at least one SLRB are configured by the network node to support the sidelink service, and (ii) to transmit a first RRC message, in response to deactivation of the sidelink service, to the network node, wherein the first RRC message includes information to indicate SLRB(s) for release. Furthermore, the CPU 308 can execute the program code 312 to perform all of the above-described actions and steps or others described herein.

Figure 23:
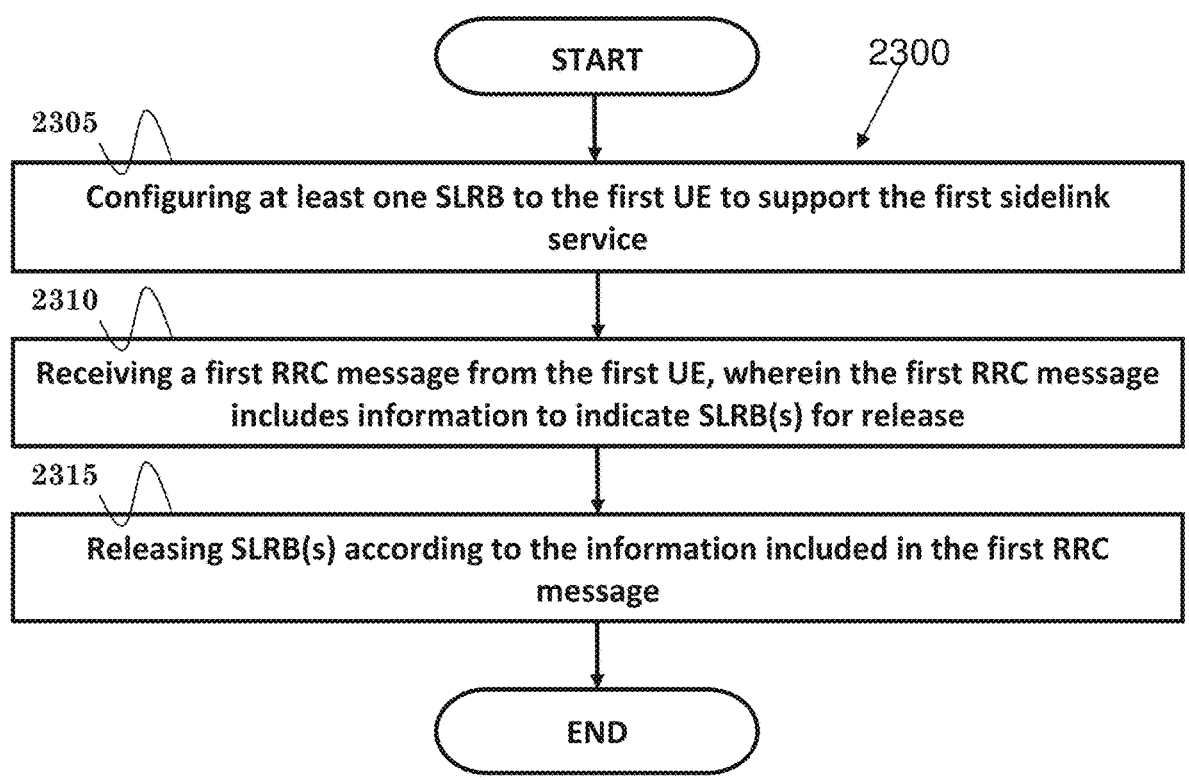
FIG. 23 is a flow chart according to one exemplary embodiment.

FIG. 23 is a flow chart 2300 according to one exemplary embodiment from the perspective of a network node to release SLRB(s) configured to a first UE, wherein a unicast link is established between the first UE and a second UE to support a first sidelink service. In step 2305, the network node configures at least one SLRB to the first UE to support the first sidelink service. In step 2310, the network node receives a first RRC message from the first UE, wherein the first RRC message includes information to indicate SLRB(s) for release. In step 2315, the network node releases SLRB(s) according to the information included in the first RRC message.

Referring back to FIGS. 3 and 4, in one exemplary embodiment of a network node. The network node 300 includes a program code 312 stored in the memory 310. The CPU 308 could execute program code 312 to enable the network node (i) to configure at least one SLRB to the first UE to support the first sidelink service, (ii) to receive a first RRC message from the first UE, wherein the first RRC message includes information to indicate SLRB(s) for release, and (iii) to release SLRB(s) according to the information included in the first RRC message. Furthermore, the CPU 308 can execute the program code 312 to perform all of the above-described actions and steps or others described herein.

In the context of the embodiments illustrated in FIGS. 22 and 23 and described above, in one embodiment, the information could be an identity or index of the first sidelink service. The information may include one or more PC5 QoS flows (PFIs) to indicate SLRBs mapped to the one or more PC5 QoS flows (PFIs) need to be released if the SLRB(s) are not shared by any PC5 QoS flow from other sidelink service. The information may also include one or more identities of the at least one SLRB if SLRB(s) identified by the one or more identities are not shared by any PC5 QoS flow from other sidelink service.

In one embodiment, the first UE could release SLRB(s) according to the information included in the first RRC message. Also, the first UE could release SLRB(s) autonomously. The first UE could release SLRB(s) in response to reception of a second RRC message from the network node.

In one embodiment, the network node could transmit a second RRC message to the first UE for SLRB release. The second RRC message may include one or more identities of the at least one SLRB for release.

In one embodiment, the first UE could transmit a third RRC message to the network node to request SLRB configuration(s) for one or more of the at least one SLRB. The third RRC message may include at least one PC5 QoS flow (PFI). The third RRC message may also include a PC5 QoS identifier (PQI) associated with each PC5 QoS flow. Furthermore, the third RRC message may include an identity or index of the first sidelink service. In addition, the third RRC message may include a destination (Layer-2) identity and/or a PC5 Link Identifier (PFI).

In one embodiment, the network node could transmit a fourth RRC message to the first UE to configure SLRB configuration(s) for one or more of the at least one SLRB. The fourth RRC message may include one or more identities of the at least one SLRB. The fourth RRC message may also include an identity or index of the first sidelink service. Furthermore, the fourth RRC message may include a destination (Layer-2) identity and/or a PC5 Link Identifier (PFI).

Figure 24:
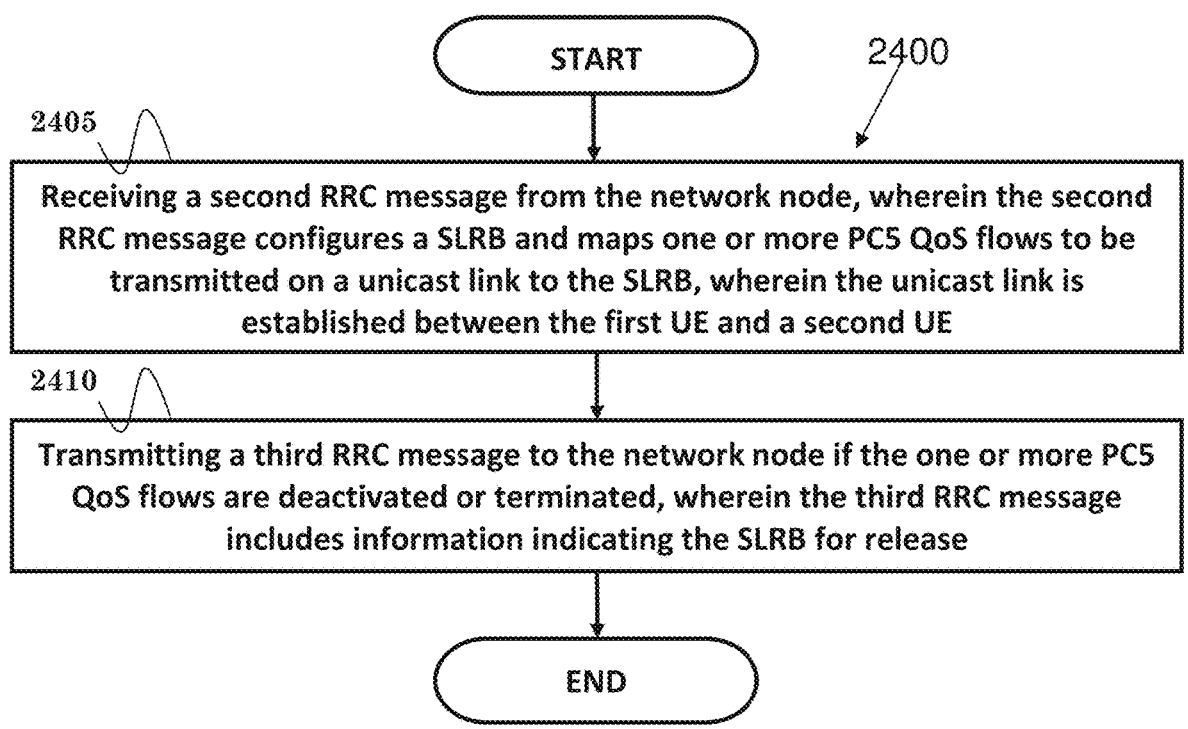
FIG. 24 is a flow chart according to one exemplary embodiment.

FIG. 24 is a flow chart 2400 according to one exemplary embodiment from the perspective of a first UE to indicate a network node to release SLRB or SL-DRB. In step 2405, the first UE receives a second RRC message from the network node, wherein the second RRC message configures a SLRB and maps one or more PC5 QoS flows to be transmitted on a unicast link to the SLRB, wherein the unicast link is established between the first UE and a second UE. In step 2410, the first UE transmits a third RRC message to the network node if the one or more PC5 QoS flows are deactivated or terminated, wherein the third RRC message includes information indicating the SLRB for release.

In one embodiment, the first UE could transmit a first RRC message to the network node for requesting a SLRB configuration, wherein the first RRC message includes PFI(s) of the one or more PC5 QoS flows. The first UE could receive a fourth RRC message from the network node, wherein the fourth RRC message reconfigures the UE to release the SLRB indicated by the information included in the third RRC message.

In one embodiment, the first RRC message may include a destination Layer-2 ID associated with the unicast link. The destination Layer-2 ID may be a source Layer-2 ID of the second UE. The first or third RRC message may be a SidelinkUEInformation. The second or fourth RRC message may be a RRC reconfiguration message.

In one embodiment, the third RRC message may be a release message for the SLRB. The third RRC message may include PFIs of the one or more PC5 QoS flows mapped to the SLRB for release. The third RRC message may include an identity of the SLRB for release or an index of a configuration configuring the SLRB for release.

In one embodiment, the network node could be a base station (e.g. gNB).

In one embodiment, the first UE could release the SLRB according to the information included in the fourth RRC message. The first UE could release SLRB(s) autonomously.

In one embodiment, the third RRC message could be transmitted to the network node if upper layer of the first UE indicates the one or more PC5 QoS flows are deactivated or terminated or if upper layer of the first UE indicates the one or more PC5 QoS flow are not mapped to the SLRB. The one or more PC5 QoS flows may be associated with a V2X service. The third RRC message could indicate the PFIs of the one or more PC5 QoS flows mapped to the SLRB are removed from a list of PC5 QoS flow included in the first RRC message.

In one embodiment, the first RRC message may include PFI(s) of the one or more PC5 QoS flows. The first RRC message may also include a PC5 QoS identifier (PQI) and/or a PC5 QoS profile associated with each PC5 QoS flow. Furthermore, the first RRC message may include a destination (Layer-2) identity and/or a PC5 Link Identifier (PFI) associated with the unicast link.

In one embodiment, the second RRC message may include one or more identities of the at least one SLRB. The second RRC message may include a destination (Layer-2) identity, an index associated with the destination (Layer-2) identity and/or a PC5 Link Identifier (PFI) associated with the unicast link.

Referring back to FIGS. 3 and 4, in one exemplary embodiment of a first UE. The first UE 300 includes a program code 312 stored in the memory 310. The CPU 308 could execute program code 312 to enable the first UE (i) to receive a second RRC message from the network node, wherein the second RRC message configures a SLRB and maps one or more PC5 QoS flows to be transmitted on a unicast link to the SLRB, wherein the unicast link is established between the first UE and a second UE, and (ii) to transmit a third RRC message to the network node if the one or more PC5 QoS flows are deactivated or terminated, wherein the third RRC message includes information indicating the SLRB for release. Furthermore, the CPU 308 can execute the program code 312 to perform all of the above-described actions and steps or others described herein.

Figure 25:
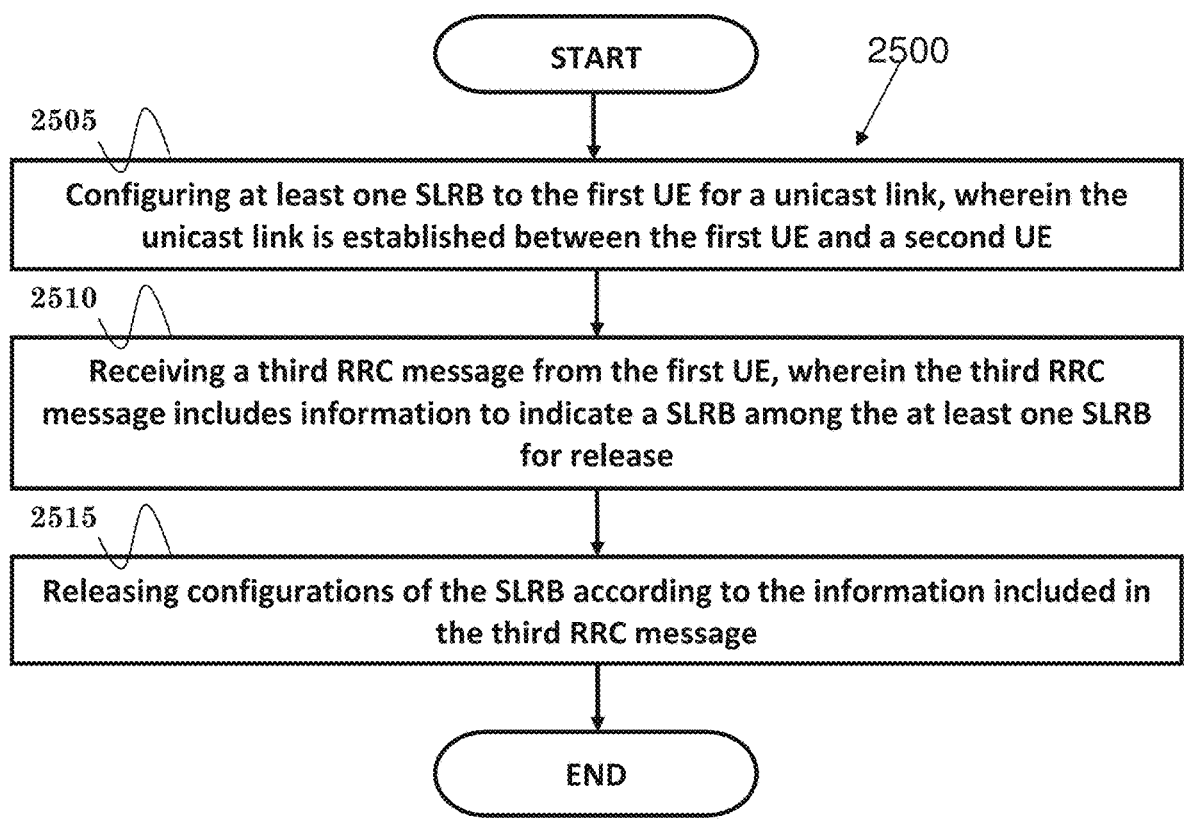
FIG. 25 is a flow chart according to one exemplary embodiment.

FIG. 25 is a flow chart 2500 according to one exemplary embodiment from the perspective of a network node to release SLRB(s) configured to a first UE. In step 2505, the network node configures at least one SLRB to the first UE for a unicast link, wherein the unicast link is established between the first UE and a second UE. In step 2510, the network node receives a third RRC message from the first UE, wherein the third RRC message includes information to indicate a SLRB among the at least one SLRB for release.

In step 2515, the network node releases configurations of the SLRB according to the information included in the third RRC message.

In one embodiment, the information may include PFI(s) of one or more PC5 QoS flows mapped to the SLRB for release. The information may also include an identity of the SLRB for release.

In one embodiment, the network node could transmit a fourth RRC message to the first UE for SLRB release. The fourth RRC message may include one or more identities of the SLRB for release.

In one embodiment, the first UE could transmit a first RRC message to the network node to request SLRB configuration(s) for the one or more PC5 QoS flows. The first RRC message may include PFI(s) of the one or more PC5 QoS flows. The first RRC message may also include a PC5 QoS identifier (PQI) and/or a PC5 QoS profile associated with each PC5 QoS flow. Furthermore, the first RRC message may include a destination (Layer-2) identity and/or a PC5 Link Identifier (PFI) associated with the unicast link.

In one embodiment, the information may indicate the PFIs of the one or more PC5 QoS flows mapped to the SLRB are removed from a list of PC5 QoS flow included in the first RRC message.

In one embodiment, the network node could transmit a second RRC message to the first UE to configure SLRB configuration(s) for one or more of the at least one SLRB. The second RRC message may include one or more identities of the at least one SLRB. The second RRC message may also include a destination (Layer-2) identity, an index associated with the destination (Layer-2) identity and/or a PC5 Link Identifier (PFI) associated with the unicast link.

In one embodiment, the first or third RRC message may be a SidelinkUEInformation. The second or fourth RRC message may be a RRC reconfiguration message.

Referring back to FIGS. 3 and 4, in one exemplary embodiment of a network node. The network node 300 includes a program code 312 stored in the memory 310. The CPU 308 could execute program code 312 to enable the network node (i) to configure at least one SLRB to the first UE for a unicast link, wherein the unicast link is established between the first UE and a second UE, (ii) to receive a third RRC message from the first UE, wherein the third RRC message includes information to indicate a SLRB among the at least one SLRB for release, and (iii) to release configurations of the SLRB according to the information included in the third RRC message. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first UE (User Equipment) to indicate a network node for releasing SLRB (Sidelink Radio Bearer) or SL-DRB (Sidelink-Data Radio Bearer), comprising:
   transmitting a first RRC (Radio Resource Control) message to a network node for requesting sidelink resource, wherein the first RRC message includes a PFI (PC5 QoS Flow Identifier) of a PC5 QoS (Quality of Service) flow in a first list of PC5 QoS flows;
   receiving a second RRC message from the network node, wherein the second RRC message configures a SLRB and maps the PC5 QoS flow to the SLRB; and
   transmitting a third RRC message to the network node if the PC5 QoS flow is deactivated or released, wherein the PFI of the PC5 QoS flow is not included in a second list of PC5 QoS flows included in the third RRC message.

2. The method of claim 1, wherein the PC5 QoS flow is to be transmitted on a PC5 unicast link and the PC5 unicast link is established between the first UE and a second UE.

3. The method of claim 1, further comprising:
   receiving a fourth RRC message from the network node, wherein the fourth RRC message reconfigures the UE to release the SLRB.

4. The method of claim 3, further comprising:
   releasing the SLRB according to the fourth RRC message.

5. The method of claim 1, wherein the first RRC message includes a destination Layer-2 ID associated with the PC5 unicast link.

6. The method of claim 5, wherein the destination Layer-2 ID (Identity) is a Layer-2 ID of the second UE.

7. The method of claim 1, wherein the first RRC message or the third RRC message is a SidelinkUEInformation.

8. The method of claim 1, wherein the second RRC message or the fourth RRC message is a RRC reconfiguration message.

9. The method of claim 1, wherein the network node is a base station.

10. A first UE (User Equipment), comprising:
    a control circuit;
    a processor installed in the control circuit; and
    a memory installed in the control circuit and operatively coupled to the processor;
    wherein the processor is configured to execute a program code stored in the memory to:
       transmit a first RRC (Radio Resource Control) message to a network node for requesting sidelink resource, wherein the first RRC message includes a PFI (PC5 QoS Flow Identifier) of a PC5 QoS (Quality of Service) flow in a first list of PC5 QoS flows;
       receive a second RRC message from the network node, wherein the second RRC message configures a SLRB (Sidelink Radio Bearer) and map the PC5 QoS flow to the SLRB; and
       transmit a third RRC message to the network node if the PC5 QoS flow is deactivated or released, wherein the PFI of the PC5 QoS flow is not included in a second list of PC5 QoS flows included in the third RRC message.

11. The first UE of claim 10, wherein the PC5 QoS flow is to be transmitted on a PC5 unicast link and the PC5 unicast link is established between the first UE and a second UE.

12. The first UE of claim 10, wherein the processor is further configured to execute a program code stored in the memory to:
    receive a fourth RRC message from the network node, wherein the fourth RRC message reconfigures the UE to release the SLRB.

13. The first UE of claim 12, wherein the processor is further configured to execute a program code stored in the memory to:
    release the SLRB according to the fourth RRC message.

14. The first UE of claim 10, wherein the first RRC message includes a destination Layer-2 ID associated with the PC5 unicast link.

15. The first UE of claim 14, wherein the destination Layer-2 ID is a Layer-2 ID of the second UE.

16. The first UE of claim 10, wherein the first RRC message or the third RRC message is a SidelinkUEInformation.

17. The first UE of claim 10, wherein the second RRC message or the fourth RRC message is a RRC reconfiguration message.

18. The first UE of claim 10, wherein the network node is a base station.

\* \* \* \* \*